US012695814B2

(12) United States Patent
Ma et al.

(10) Patent No.: US 12,695,814 B2
(45) Date of Patent: Jul. 28, 2026

(54) METHOD OF SUBSCRIBING TO NOTIFICATION IN INTERNET OF THINGS SYSTEM

(71) Applicants: Beijing BOE Technology Development Co., Ltd., Beijing (CN); BOE TECHNOLOGY GROUP CO., LTD., Beijing (CN)

(72) Inventors: Mingyuan Ma, Beijing (CN); Junjie Zhao, Beijing (CN); Xinyin Wu, Beijing (CN); Honglei Zhang, Beijing (CN); Wei Pan, Beijing (CN); Feng Feng, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 18/996,087

(22) PCT Filed: Apr. 26, 2024

(86) PCT No.: PCT/CN2024/090107
§ 371 (c)(1),
(2) Date: Jan. 17, 2025

(87) PCT Pub. No.: WO2024/222887
PCT Pub. Date: Oct. 31, 2024

(65) Prior Publication Data
US 2026/0052189 A1      Feb. 19, 2026

(30) Foreign Application Priority Data

Apr. 28, 2023    (CN) ......................... 202310484636.7

(51) Int. Cl.
*H04L 67/10* (2022.01)
*G16Y 40/10* (2020.01)
(Continued)

(52) U.S. Cl.
CPC .............. *H04L 67/55* (2022.05); *G16Y 40/10* (2020.01); *H04L 67/56* (2022.05); *H04L 67/60* (2022.05)

(58) Field of Classification Search
CPC ......... H04L 67/55; H04L 67/56; H04L 67/60; H04L 67/10; H04L 67/12; H04L 43/00; G16Y 40/10; G06F 9/54; H04W 4/70
(Continued)

(56) References Cited

U.S. PATENT DOCUMENTS

2016/0065491 A1    3/2016  Bentley et al.
2023/0143200 A1*   5/2023  Kweon ................. H04W 88/18
                                                      709/223

FOREIGN PATENT DOCUMENTS

CN        102984284 A        3/2013
CN        105471604 A        4/2016
(Continued)

*Primary Examiner* — Jude Jean Gilles
(74) *Attorney, Agent, or Firm* — Collard & Roe, P.C.; William Collard

(57)            ABSTRACT

The present disclosure relates to a method of subscribing to notification in an Internet of Things system. The Internet of Things system includes a requester, a target and an agent, and the method includes: determining a first time interval and a second time interval, where the first time interval is a time interval in which the requester expects to receive an event notification from the target, and the second time interval is a time interval in which the target is able to send an event notification; determining whether the second time interval exceeds the first time interval; and receiving, by the agent in response to determining that the second time interval exceeds the first time interval, an event notification (Continued)

from the target according to the second time interval and notifying the requester according to the first time interval.

13 Claims, 16 Drawing Sheets

(51) Int. Cl.
*H04L 43/00* (2022.01)
*H04L 67/12* (2022.01)
*H04L 67/55* (2022.01)
*H04L 67/56* (2022.01)
*H04L 67/60* (2022.01)
*G06F 9/54* (2006.01)
*H04W 4/70* (2018.01)

(58) Field of Classification Search
USPC ......................................................... 709/202
See application file for complete search history.

(56) References Cited

FOREIGN PATENT DOCUMENTS

| CN | 109995788 A | 7/2019 |
|----|-------------|--------|
| CN | 110731074 A | 1/2020 |
| CN | 115152196 A | 10/2022 |
| WO | 2022/078567 A1 | 4/2022 |

\* cited by examiner

30

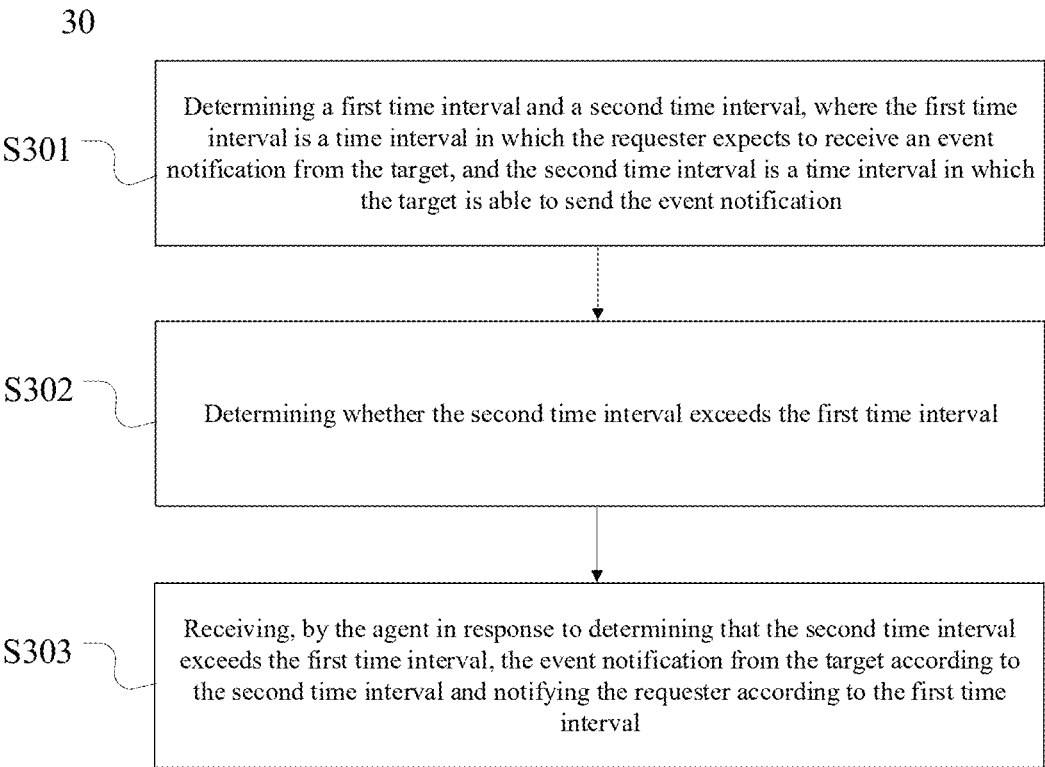

S301

Determining a first time interval and a second time interval, where the first time interval is a time interval in which the requester expects to receive an event notification from the target, and the second time interval is a time interval in which the target is able to send the event notification

S302

Determining whether the second time interval exceeds the first time interval

S303

Receiving, by the agent in response to determining that the second time interval exceeds the first time interval, the event notification from the target according to the second time interval and notifying the requester according to the first time interval

Fig. 3

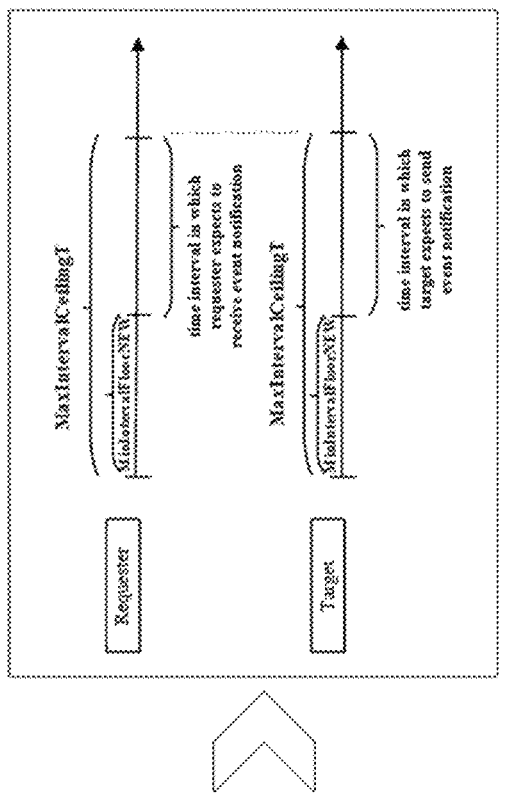
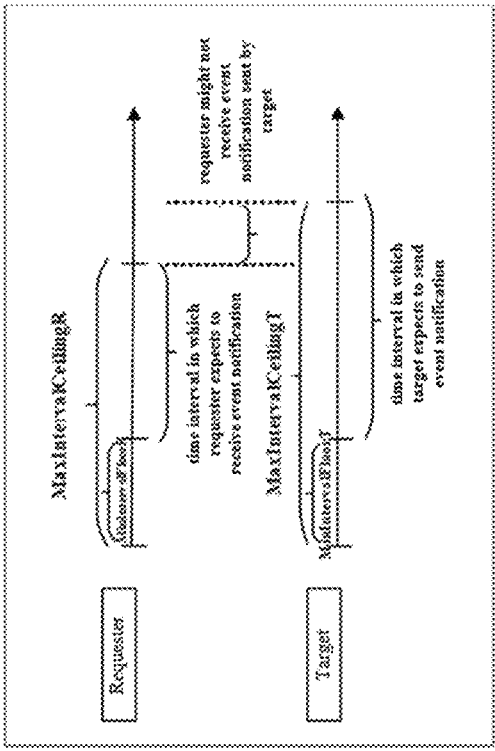
Fig. 12

1200

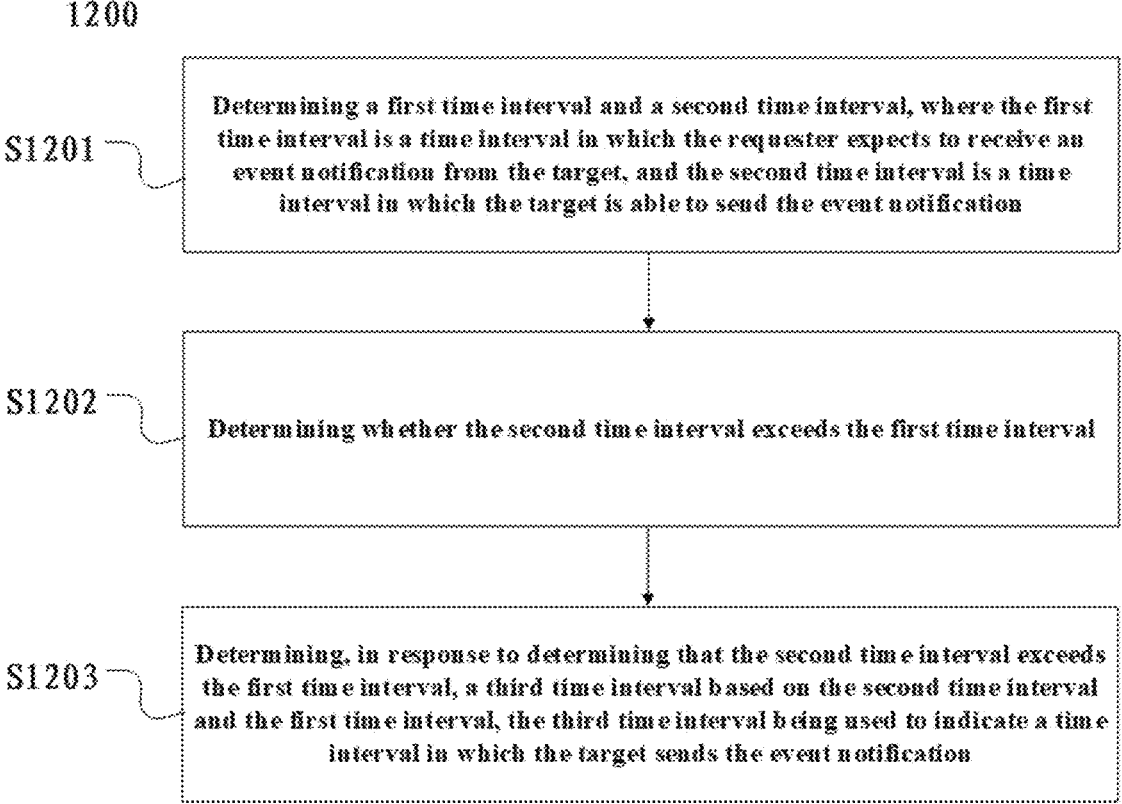

S1201 — Determining a first time interval and a second time interval, where the first time interval is a time interval in which the requester expects to receive an event notification from the target, and the second time interval is a time interval in which the target is able to send the event notification S1202 — Determining whether the second time interval exceeds the first time interval S1203 — Determining, in response to determining that the second time interval exceeds the first time interval, a third time interval based on the second time interval and the first time interval, the third time interval being used to indicate a time interval in which the target sends the event notification

METHOD OF SUBSCRIBING TO NOTIFICATION IN INTERNET OF THINGS SYSTEM

CROSS REFERENCE TO RELATED APPLICATIONS

This application is the National Stage of PCT/CN2024/090107 filed on Apr. 26, 2024, which claims priority under 35 U.S.C. § 119 of Chinese Application No. 202310484636.7 filed on Apr. 28, 2023, the disclosure of which is incorporated by reference.

TECHNICAL FIELD

The present disclosure relates to a method of subscribing to notification in an Internet of Things system, an agent in the Internet of Things system, an electronic device and a non-transient computer-readable medium.

BACKGROUND

Internet of Things (IOT), which is a network based on Internet, traditional telecommunication networks, among other information carriers, enables all ordinary physical objects that can be independently addressed to achieve interconnection and intercommunication. Therefore, the core of IoT is to achieve intercommunication between machine and machine, i.e., M2M (machine to machine).

In order to achieve intercommunication between machine and machine, commonly used implementations include a requesting-responding mode which is a mode for a single interaction, and a subscribing-notifying mode which is a mode for multiple interactions and is suitable for requirements in IoT environment. Therefore, IoT systems universally employ the subscribing-notifying mode to achieve interaction for M2M, i.e., interaction among IoT devices.

In an IoT system, some IoT devices have high requirements for saving power consumption, and cannot remain in activated status for a long time. Therefore, there is a need for designing a method of subscribing to notification that meets the energy-saving demands for the IoT devices, improving the adaptability of the IoT system, and satisfying the requirements for the IoT devices in different scenarios.

SUMMARY

An embodiments of the present disclosure provides a method of subscribing to notification in an Internet of Things system including a requester, a target and an agent. The method includes: determining a first time interval and a second time interval, where the first time interval is a time interval in which the requester expects to receive an event notification from the target, and the second time interval is a time interval in which the target is able to send the event notification; determining whether the second time interval exceeds the first time interval; and receiving, by the agent in response to determining that the second time interval exceeds the first time interval, the event notification from the target according to the second time interval and notifying the requester according to the first time interval.

An embodiment of the present disclosure provides a subscription management method for an Internet of Things system including a requester, a target and an agent. The method includes: sending, by the requester to the target, a first subscription request indicating that the requester expects to receive an event notification in a first time interval; receiving, by the requester from the target, a response for the first subscription request indicating that the target is able to send the event notification in a second time interval; determining, by the requester, whether the second time interval exceeds the first time interval; sending, by the requester in response to determining that the second time interval exceeds the first time interval, a second subscription request to the agent, the second subscription request indicating that the agent receives the event notification from the target and including the first time interval; sending, by the agent to the target, a third subscription request including an identifier of the requester and the first time interval; sending, by the target to the agent, a response for the third subscription request including the second time interval; sending, by the agent to the requester, a response for the second subscription request indicating that the agent receives the event notification from the target; sending, by the agent in response to there being no event notification received by the agent from the target in the first time interval, the event notification of null message or cached data message to the requester; and sending, by the agent in response to there being the event notification received by the agent from the target in the second time interval, the event notification containing the latest data of the target to the requester.

An embodiment of the present disclosure provides an agent in an Internet of Things system. The agent is configured to: receive from a requester a first subscription request indicating that the requester expects to receive an event notification in a first time interval; send to a target a second subscription request indicating that the agent expects to receive the event notification in the first time interval; receive from the target a response for the second subscription request indicating that the target is able to send the event notification in a second time interval; determine whether the second time interval exceeds the first time interval; receive, in response to determining that the second time interval exceeds the first time interval, the event notification from the target according to the second time interval and notify the requester according to the first time interval; send, in response to there being no event notification received by the agent from the target in the first time interval, the event notification of null message or cached data message to the requester; and send, in response to there being the event notification received by the agent from the target in the second time interval, the event notification containing the latest data of the target to the requester.

An embodiment of the present disclosure provides a method of subscribing to notification in an Internet of Things system including a requester and a target. The method includes: determining a first time interval and a second time interval, where the first time interval is a time interval in which the requester expects to receive an event notification from the target, and the second time interval is a time interval in which the target is able to send the event notification; determining whether the second time interval exceeds the first time interval; and determining, in response to determining that the second time interval exceeds the first time interval, a third time interval based on the second time interval and the first time interval, the third time interval being used to indicate a time interval in which the target sends the event notification.

An embodiment of the present disclosure provides an electronic device. The electronic device includes: one or more processors; and one or more memories having stored therein computer-readable codes which, when executed by the one or more processors, perform the method as described above.

According to yet another embodiment of the present disclosure, there is further provided a computer-readable storage medium having stored thereon instructions which, when executed by a processor, cause the processor to perform the method as described above.

According to another aspect of the present disclosure, there is provided a computer program product or computer program including computer instructions. The computer instructions are stored in a computer-readable storage medium. A processor of a computer device reads the computer instructions from the computer-readable medium, and the processor executes the computer instructions to cause the computer device to perform the method as provided in various aspects as described above or in various alternative implementations of various aspects as described above.

With the embodiments of the present disclosure, even in a case where the time interval in which the target sends an event notification exceeds the time interval in which the requester expects to receive, the requester is enabled to receive an event notification. As such, a more efficient effect of subscribing to event notification is achieved.

BRIEF DESCRIPTION OF DRAWINGS

In order to illustrate the technical solution of the embodiments of the present disclosure more clearly, the drawings needed to be used in the description of the embodiments will be briefly introduced below. Apparently, the drawings in the following description are merely some of the embodiments of the present disclosure, and according to such drawings, it is possible for those ordinary skilled in the art to obtain other drawings without paying creative labor. The following drawings are not deliberately scaled to the actual size, with emphasis on showing the gist of the present disclosure.

FIG. 3 shows a flowchart of a method 30 of subscribing to a notification in an Internet of Things system according to an embodiment of the present disclosure.

FIG. 12 is a schematic diagram showing a method of subscribing to a notification in an Internet of Things system according to an embodiment of the present disclosure.

FIG. 13 is a flowchart showing a method of subscribing to a notification in an Internet of Things system according to an embodiment of the present disclosure.

DETAILED DESCRIPTION

Figure 1:
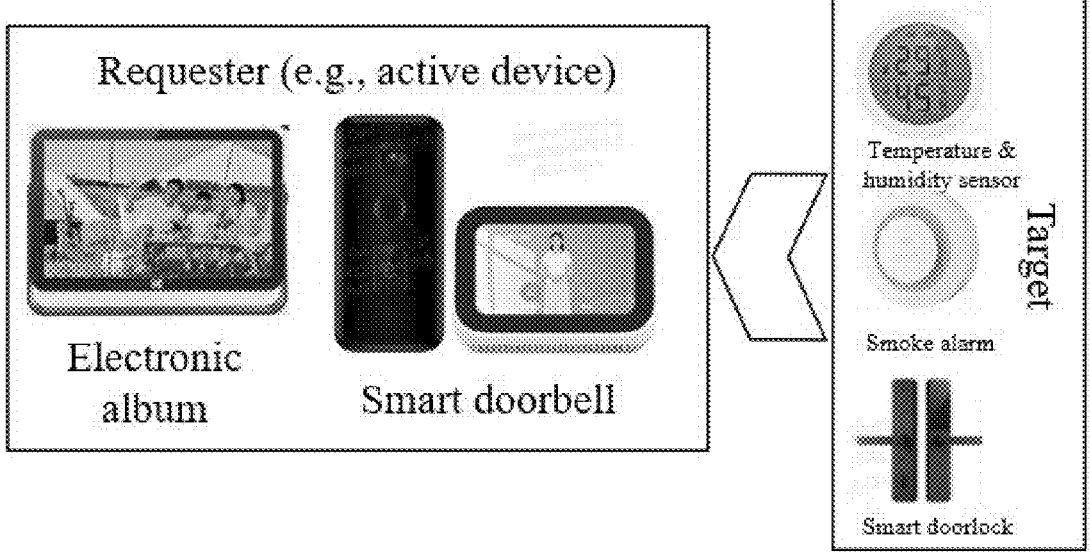
FIG. 1 shows an application scenario according to an embodiment of the present disclosure, showing various active devices and passive devices.

In order to make the objectives, technical solutions, and advantages of the present disclosure more evident, the example embodiments according to the present disclosure will be described in detail below with reference to the drawings. Obviously, the described embodiments are merely some of the embodiments of the present disclosure, but not all the embodiments of the present disclosure. It should be understood that the present disclosure is not limited by the example embodiments as described herein.

In the specification and drawings, substantially like or similar steps and elements are denoted by like or similar reference numerals, and redundant descriptions of such steps and elements will be omitted. Meanwhile, in the description of the present disclosure, terms such as "first" and "second" are only used to distinguish among descriptions, and cannot be understood as indicating or implying relative importance or order.

With the development of information technology, particularly Internet technology, the Internet of Things (IOT) technology—which enables informatization, remote management control, and intelligent networking—is gradually maturing. An IoT joins sensors, controllers, machines, persons, and things together in a new way by utilizing communication technologies such as local network or Internet, forming an interconnection between a person and a thing or between things. The IoT, which is an extension of Internet, includes the Internet and all resources across the Internet, and is compatible with all applications of the Internet. With the application of IoT technologies in various fields, various new application fields have emerged, such as smart home, smart transportation, smart health, and so on.

FIG. 1 shows an application scenario according to an embodiment of the present disclosure. Taking a scenario of a smart home as an example, it shows various active devices and passive devices.

As shown in FIG. 1, a smart home may include various devices such as the smart doorbell, electronic album, temperature and humidity sensor, smoke alarm, smart doorlock in FIG. 1.

These devices can function as either requesting entities or target entities within the IoT ecosystem. Specifically, within IoT networks, both requesters and targets may be non-mains-powered devices operating on battery power, achieving device-to-device communication through either local or remote connectivity protocols. Similarly, requesting devices may also be non-mains-powered. While target devices can be mains-powered, they cannot maintain continuous operational states for extended periods due to energy consumption considerations.

The requester may implement the acquisition of data or the control of the target's behavior by subscribing to event notifications from the target. For example, in a smart home system, a smart doorbell or an electronic album may act as the requester to subscribe, from the target (e.g., temperature and humidity sensor, smoke alarm, smart doorlock), to electric energy consumption event notification, temperature measurement result, humidity measurement result, smoke event monitoring result, doorlock status notification and the like. Upon detecting a corresponding event, the target may send an event notification to the requester. For example, the electronic album acting as the requester may display real-time electric energy consumption data, temperature measurement result, humidity measurement result, smoke event monitoring result, and doorlock status notification, after receiving the event notification. The smart doorbell acting as the requester may perform a corresponding alarm operation and the like, after receiving the doorlock status notification. The present disclosure is not limited to this.

Figure 2:
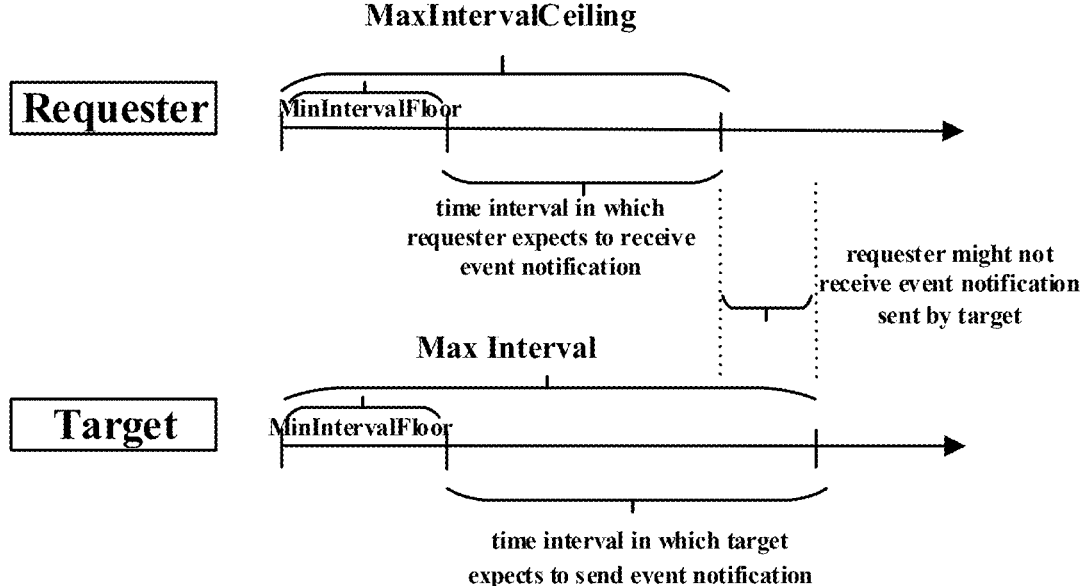
FIG. 2 shows a scenario where a requester may not be able to receive an event notification from a target.

FIG. 2 shows a scenario where a requester may not be able to receive an event notification from a target.

Under the existing subscribing and notifying mechanism (e.g., Matter standard based subscribing and notifying mechanism), the requester may send a subscription request message (e.g., SubscribeRequestMessage) to the target. The target might then send to the requester a response for the subscription request message. As such, the requester realizes the subscription to event notification from the target.

The subscription request message and the response for the subscription request message might include various parameters such as KeepSubscriptions, MinIntervalFloor, MaxIntervalCeiling, AttributeRequests, EventFilters, FabricFilters, DataVersionFilters, EventRequests, and the like. MinIntervalFloor and MaxIntervalCeiling are parameters for controlling work-sleep time intervals for IOT devices. MinIntervalFloor represents a minimum interval time selected by a certain device for any subscription, and MaxIntervalCeiling represents a maximum interval time selected by the device for any subscription. After sending a response for the subscription request message, the target might be active between MinIntervalFloor and MaxInterval, as indicated in its response for the subscription request message, where MaxInterval is a maximum between MaxIntervalCeiling and SUBSCRIPTION_MAX_INTERVAL_PUBLISHER_LIMIT, which is a maximum notification time for the target. MinIntervalFloor and MaxIntervalCeiling were originally designed to balance communication frequency and energy consumption for a device, ensuring that the device is able to save energy as much as possible without affecting performance. Indeed, the present disclosure is not limited to this.

For example, the requester may be an electronic album. Due to an electronic album's power supply mode (either battery-powered or mains-powered), it does not need to maintain continuous network activation and typically enters periodic sleep cycles. As shown in FIG. 2, the electronic album acting as the requester might sleep for one hour and work for one hour in every cycle, then the MinIntervalFloor corresponding to the electronic album is one hour, and the MaxIntervalCeiling is two hours. Assuming that the current time is 12:00 at noon, then the electronic album may expect to sleep from 12:00 to 13:00 at noon, work from 13:00 to 14:00, then sleep from 14:00 to 15:00, and so on. During the working hours from 13:00 to 14:00, the electronic album expects to receive an event notification from the target. The requester may inform the target of MinIntervalFloor=1 h and MaxIntervalCeiling=2 h through a subscription request message. Such a setting can save electric energy without affecting device performance.

The target might be a temperature sensor. The battery of the temperature sensor is low (if a button cell is employed), and the period for sending the temperature data outward is relatively long. For example, the temperature sensor may specify, in the subscription response, MinIntervalFloor to be 1 hour and MaxInterval to be 3 hours, which requires the working hours for the requester, i.e., the electronic album, to be between MinIntervalFloor and MaxInterval, that is, requires the electronic album to work for 2 hours and rest for 1 hour in every cycle. Assuming that the current time is 12:00 at noon, then the temperature sensor requires the electronic album to sleep from 12:00 to 13:00 at noon, work from 13:00 to 15:00, then sleep from 15:00 to 16:00, and so on. During working hours from 13:00 to 15:00, the temperature sensor might send an event notification to the requester, i.e., the electronic album, at any time.

As shown in FIG. 2, the MaxInterval (e.g., 3 h) corresponding to the target might be larger than the MaxIntervalCeiling (e.g., 2 h) corresponding to the requester, that is, the requirement of the target is inconsistent with the expectation of the requester, which leads to a case where if the target sends an event notification between 14:00 and 15:00, the requester in sleep will not receive the event notification from the target, which in turn leads to failure in subscription.

To this end, the embodiments of the present disclosure provide a method of subscribing to a notification in an IoT, solving a problem of failing to subscribe that might occur in a current IoT system.

Specifically, the embodiments of the present disclosure provide a method of subscribing to a notification in an Internet of Things system including a requester, a target and an agent. The method includes: determining a first time interval and a second time interval, where the first time interval is a time interval in which the requester expects to receive an event notification from the target, and the second time interval is a time interval in which the target is able to send the event notification; determining whether the second time interval exceeds the first time interval; and receiving, by the agent in response to determining that the second time interval exceeds the first time interval, the event notification from the target according to the second time interval and notifying the requester according to the first time interval.

Specifically, an embodiment of the present disclosure further provides a method of subscribing to a notification in an Internet of Things system including a requester and a target. The method includes: determining a first time interval and a second time interval, where the first time interval is a time interval in which the requester expects to receive an event notification from the target, and the second time interval is a time interval in which the target is able to send the event notification; determining whether the second time interval exceeds the first time interval; and determining, in response to determining that the second time interval exceeds the first time interval, a minimum time interval threshold to be updated for the target based on the second time interval and the first time interval.

FIG. 3 shows a flowchart of a method 30 of subscribing to a notification in an Internet of Things system according to an embodiment of the present disclosure.

Referring to FIG. 3, an IoT system according to an embodiment of the present disclosure includes a requester, a target, and an agent. The method 30 includes steps S301 to S303.

In step S301, a first time interval and a second time interval are determined, where the first time interval is a time interval in which the requester expects to receive an event notification from the target, and the second time interval is a time interval in which the target is able to send the event notification.

In step S302, it is determined whether the second time interval exceeds the first time interval.

In step S303, in response to determining that the second time interval exceeds the first time interval, the agent receives the event notification from the target according to the second time interval and notifies the requester according to the first time interval.

Alternatively, the method 30 might be performed by the requester. In this case, step S301 includes: sending, by the requester to the target, a first subscription request indicating that the requester expects to receive an event notification in the first time interval, and receiving, by the requester from the target, a response for the first subscription request indicating that the target is able to send an event notification in the second time interval. Step S302 includes: determining, by the requester, whether the second time interval exceeds the first time interval, and sending, by the requester in response to determining that the second time interval exceeds the first time interval, a subscription request to the agent, to cause the agent to receive an event notification from the target according to the second time interval and to notify the requester according to the first time interval. Indeed, the present disclosure is not limited to this.

Alternatively, the method 30 might be performed by the agent. In this case, step S301 includes: receiving, by the agent from the requester, a first subscription request indicating that the requester expects to receive an event notification in the first time interval; sending, by the agent to the target, a second subscription request indicating that the agent expects to receive an event notification in the first time interval; and receiving, by the agent from the target, a response for the second subscription request indicating that the target is able to send an event notification in the second time interval.

The method 30 guarantees the normal progress of subscribing to notification through the agent, without adjusting the working hours of the requester and the target at the same time. In the method 30, in a case where the target cannot send an event notification in the first time interval, the agent may receive an event notification temporarily from the target according to the second time interval, and in turn, send an event notification to the requester in the first time interval.

In order to illustrate the method 30 more clearly, application examples of the method 30 are further illustrated in combination with FIGS. 4 to 18. It should be understood by those skilled in the art that the present disclosure is not limited to this.

Figure 4:
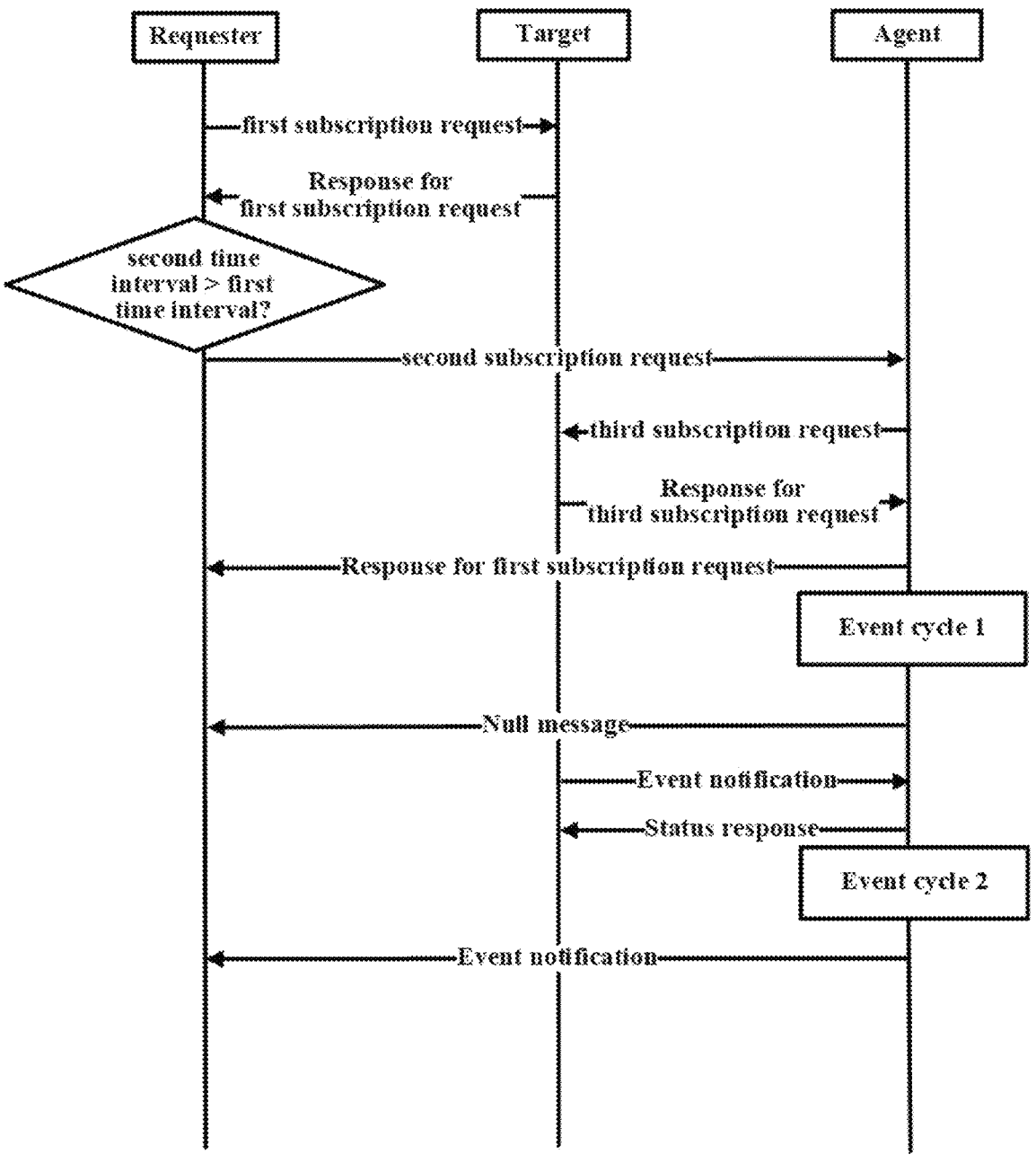
FIG. 4 is a schematic diagram showing interaction among a requester, a target and an agent in an Internet of Things according to an embodiment of the present disclosure.

FIG. 4 is a schematic diagram showing interaction among a requester, a target and an agent in an Internet of Things according to an embodiment of the present disclosure, where the requester implements the method 30.

As shown in FIG. 4, in step S301, the requester sends to the target a first subscription request indicating that the requester expects to receive an event notification in a first time interval. Next, the requester receives from the target a response for the first subscription request indicating that the target is able to send an event notification in a second time interval.

An example is taken where the requester is an electronic album and the target is an environmental thermometer. The range of the time interval in which the electronic album expects to receive an event notification is (1 h, 1.5 h), and the electronic album will start to sleep if the 1.5 h is exceeded, and an inherent maximum interval threshold built in the thermometer for sending an event notification is 3 h. In the above step S301, the electronic album sends a subscription request to the environmental thermometer, including the first time interval (1 h, 1.5 h) in which the electronic album expects to receive an event notification, where the maximum interval threshold (Max interval) corresponding to the first time interval is 1.5 hours, and the minimum interval threshold (Min interval) is 1 hour. After receiving the subscription request, the environmental thermometer sends a subscription reply to the electronic album, including the maximum interval threshold (Max interval) corresponding to the second time interval supported by the thermometer for sending an event notification as 3 hours. Indeed, the present disclosure is not limited to this.

Then, in step S302, the requester determines whether the second time interval exceeds the first time interval. The above example is continued where the requester is an electronic album and the target is an environmental thermometer. After receiving the subscription reply, the electronic album determines whether the maximum interval threshold (Max interval) corresponding to the first time interval is greater than the maximum interval threshold (Max interval ceiling) corresponding to the second time interval.

Next, in step S303, in response to determining that the second time interval exceeds the first time interval, the requester sends to the agent a second subscription request, where the second subscription request indicates that the agent receives an event notification from the target, and includes the first time interval.

In the above example, since 3 h>1.5 h, it can be seen that the second time interval exceeds the first time interval. The electronic album sends a second subscription request to the agent. The second subscription request includes an identifier of the requester, an identifier of the target, and a second time interval. At this time, the identifier of the requester indicates that the agent deputizes for the subscription management of the electronic album, the identifier of the target identifies the thermometer, and the first time interval is a range of time interval (1 h, 1.5 h) in which the electronic album expects to receive an event notification.

Alternatively, in the scenario as shown in FIG. 4, the method 30 may further include: sending, by the agent to the target, a third subscription request including an identifier of the requester and the first time interval; sending, by the target to the agent, a response for the third subscription request including the second time interval; sending, by the agent to the requester, a response for the second subscription request indicating that the agent receives an event notification from the target; sending, by the agent in response to there being no event notification received by the agent from the target in the first time interval, an event notification of null message or cached data message to the requester; and sending, by the agent in response to there being an event notification received by the agent from the target in the second time interval, an event notification containing the latest data of the target to the requester.

Specifically, in the above example, the agent sends a third subscription request to the thermometer. The third subscription request includes a range of time interval (1 h, 1.5 h) in which the requester, which is an electronic album, expects to receive an event notification. Then, the thermometer sends a response for the third subscription request to the agent, including the maximum interval (Maxinterval) corresponding to the second time interval supported by the thermometer as 3 h. Then, the agent sends a response for the first subscription request to the electronic album, including the maximum interval for the agent to send an event notification as 1.5 h, which means that if the subscription is successful, an event notification will be sent to the electronic album in the range of time interval (1.5 h) in which the electronic album expects the event notification to be sent.

Assuming that in event cycle 1 of the electronic album (e.g., from 12:00 to 13:30 at noon), the agent receives no event notification from the thermometer, and the agent sends to the electronic album an event notification with content as null. Then, assuming that at 14:00, the agent receives an event notification from the thermometer, at which time the electronic album is already in sleep. Next, in event cycle 2 (e.g., from 14:30 to 16:00) in which the electronic album works, the agent sends the electronic album the event notification it received from the thermometer at 14:00, with content as temperature data.

As such, in a case where the thermometer cannot meet the request by the electronic album for subscribing to event notification, the demand of the electronic album for subscription can be met with the intermediary effect of the agent.

According to FIG. 3 and FIG. 4, aspect 1 of the embodiments of the present disclosure further provides a requester in an Internet of Things system. The requester is configured to: determine a first time interval and a second time interval, where the first time interval is a time interval in which the requester expects to receive an event notification from a target, and the second time interval is a time interval in which the target is able to send an event notification; determine whether the second time interval exceeds the first time interval; and send, in response to determining that the second time interval exceeds the first time interval, a subscription request to an agent, to request the agent to receive an event notification from the target and notify the requester according to the first time interval. Alternatively, in aspect 1, the determining the first time interval and the second time interval includes: sending to the target a first subscription request indicating that the requester expects to receive an event notification in the first time interval; and receiving from the target a response for the first subscription request indicating that the target is able to send an event notification in the second time interval.

Correspondingly, according to FIGS. 3 and 4, aspect 2 of the embodiments of the present disclosure further provides an agent in an Internet of Things system. The agent is configured to: receive from a requester a first subscription request, where the first subscription request indicates that the agent receives an event notification from a target, as well as the first time interval which is a time interval in which the requester expects to receive an event notification from the agent; send to the target a second subscription request including an identifier of the agent and the first time interval;

receive from the target a response for the second subscription request including a second time interval, which is a time interval in which the target is able to send an event notification; and send to the requester a response for the first subscription request indicating that an event notification is sent to the requester according to the first time interval. Alternatively, in aspect 2, the agent sends, in response to there being no event notification received by the agent from the target in the first time interval, an event notification including a null message or a cached data message to the requester; and the agent sends, in response to there being an event notification received by the agent from the target in the second time interval, an event notification containing the latest data of the target to the requester.

Correspondingly, according to FIGS. 3 and 4, aspect 3 of the embodiments of the present disclosure further provides a system for subscription management in an Internet of Things. The system includes a requester, a target, and an agent. In aspect 3, the requester sends to the target a first subscription request indicating that the requester expects to receive an event notification in a first time interval; the requester receives from the target a response for the first subscription request indicating that the target is able to send an event notification in a second time interval; the requester determines whether the second time interval exceeds the first time interval; the requester sends, in response to determining that the second time interval exceeds the first time interval, a second subscription request to the agent, where the second subscription request indicates that the agent receives an event notification from the target, and includes the first time interval; the agent sends to the target a third subscription request including an identifier of the requester and the first time interval; the target sends to the agent a response for the third subscription request including the second time interval; the agent sends to the requester a response for the second subscription request indicating that the agent receives an event notification from the target; the agent sends, in response to there being no event notification received by the agent from the target in the first time interval, an event notification of null message or cached data message to the requester; and the agent sends, in response to there being an event notification received by the agent from the target in the second time interval, an event notification containing the latest data of the target to the requester.

Figure 5:
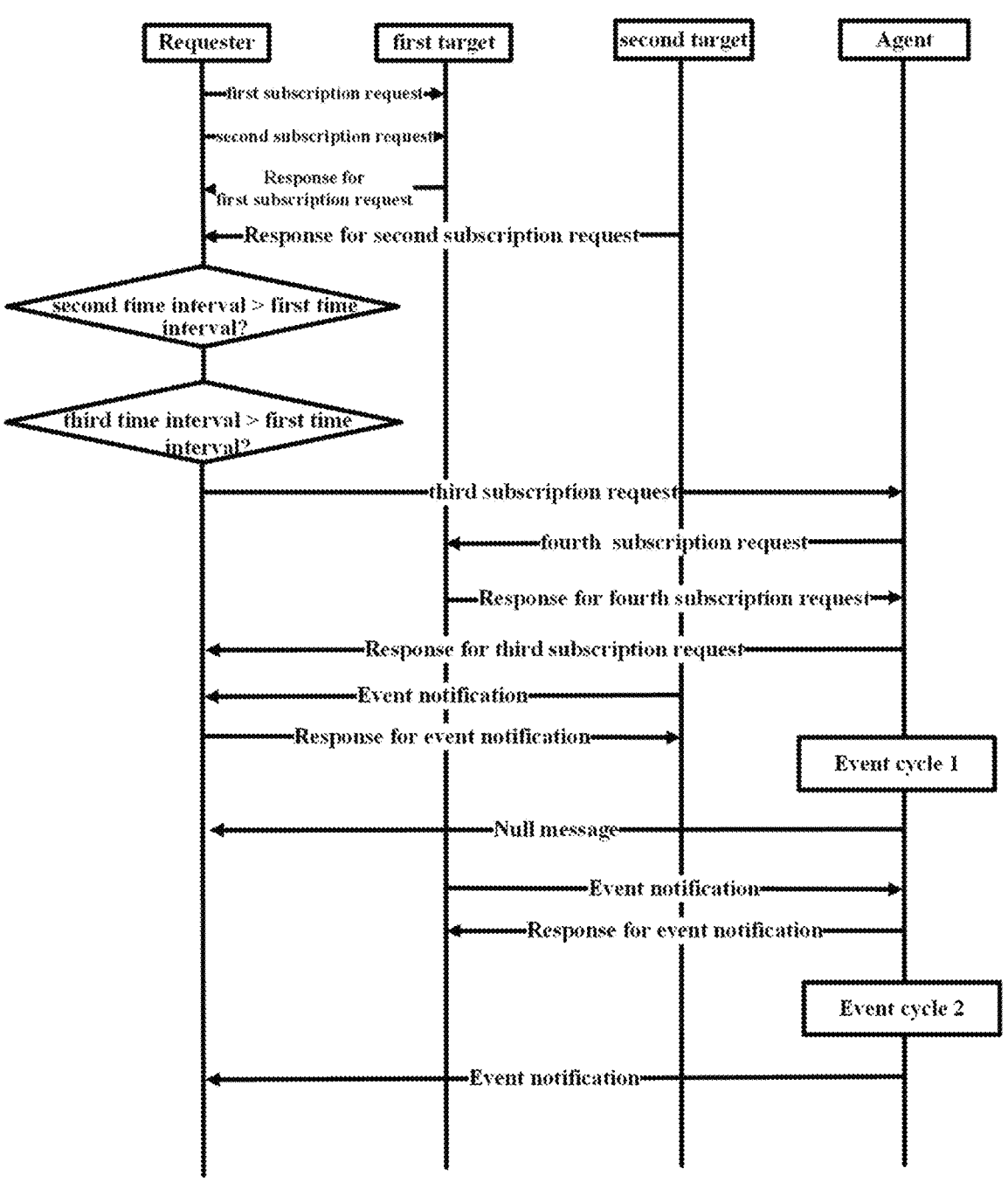
FIG. 5 is a schematic diagram showing interaction among a requester, a first target, a second target and an agent in an Internet of Things according to an embodiment of the present disclosure.

FIG. 5 is a schematic diagram showing interaction among a requester, a first target, a second target and an agent in an Internet of Things according to an embodiment of the present disclosure. The example scenario where the method 30 is applied as shown in FIG. 5 relates to a situation where the requester needs to subscribe from a plurality of targets. In the current interactive flow of subscribing to notification, if some of the plurality of targets are not able to send in a range of the time interval as expected by the requester, the effect of subscription will be affected, causing failure in subscription. To this end, by applying the method 30 in the scenario as shown in FIG. 5, the problem of failing to subscribe can be solved by the agent.

Specifically, in the example scenario where the method 30 is applied as shown in FIG. 5, the method 30 is implemented by the requester, the target in the method 30 includes a first target and a second target, the first target is able to send an event notification in the second time interval, while the second target is able to send an event notification in a third time interval.

For example, in the example scenario where the method 30 is applied as shown in FIG. 5, the method 30 further includes: receiving, by the agent in response to determining that the second time interval exceeds the first time interval, an event notification from the first target according to the second time interval and notifying the requester according to the first time interval; and receiving, by the agent in response to determining that the third time interval does not exceed the first time interval, an event notification from the second target according to the third time interval and notifying the requester according to the first time interval. Indeed, the present disclosure is not limited to this.

Specifically, as shown in FIG. 5, in step S301, the requester sends to the first target and the second target a first subscription request and a second subscription request respectively, both indicating that the requester expects to receive an event notification in the first time interval; the requester receives from the first target a response for the first subscription request indicating that the first target is able to send an event notification in the second time interval; the requester receives from the second target a response for the second subscription request indicating that the first target is able to send an event notification in the third time interval.

An example is taken where the requester is an electronic album, the first target is an environmental thermometer and the second target is an environmental hygrometer. The range of the time interval in which the electronic album expects to receive an event notification is (1 h, 1.5 h), and the electronic album will start to sleep if the 1.5 h is exceeded. An inherent maximum interval threshold built in the thermometer for sending an event notification is 3 h, and an inherent maximum interval threshold built in the hygrometer for sending an event notification is 1.5 h. In the above step S301, the electronic album sends a subscription request to the environmental thermometer and the environmental hygrometer, including a first time interval (1 h, 1.5 h) in which the electronic album expects to receive an event notification, where the maximum interval threshold (Max interval ceiling) corresponding to the first time interval is 1.5 hours, and the minimum interval threshold (Min interval) is 1 hour. After receiving the subscription request, the environmental thermometer sends a subscription reply to the electronic album, including the maximum interval threshold (Max interval-1) corresponding to the second time interval supported by the thermometer for sending an event notification as 3 hours. After receiving the subscription request, the environmental hygrometer sends a subscription reply to the electronic album, including the maximum interval threshold (Max interval-2) corresponding to the third time interval supported by the hygrometer for sending an event notification as 1.5 hours.

Next, in step S302, the requester determines whether the second time interval exceeds the first time interval and whether the third time interval exceeds the first time interval. For example, after receiving the subscription reply, the electronic album determines whether the maximum interval (Max interval-1)>the maximum interval threshold (Max Interval ceiling) of the electronic album, and whether Max interval-2<=Max Interval ceiling.

Alternatively, in response to determining that the third time interval does not exceed the first time interval, the requester may receive the event notification directly from the second target. That is, the electronic album may subscribe from the hygrometer by itself. For example, as shown in FIG. 5, the requester will receive an event notification from the second target and send a response for the event notification to the second target. Indeed, the electronic album may also make the agent subscribe to event notifications from the hygrometer, and the present disclosure is not limited to this.

Next, in operation S303, in response to determining that the second time interval exceeds the first time interval, the requester sends to the agent a third subscription request, where the third subscription request indicates that the agent receives an event notification from the first target, and includes the first time interval.

In the above example, since 3 h>1.5 h, it can be seen that the second time interval exceeds the first time interval. The electronic album sends a third subscription request to the agent. The third subscription request includes an identifier of the requester, an identifier of the target, and a second time interval. At this time, the identifier of the requester indicates that the agent deputizes for the subscription management of the electronic album, the identifier of the target identifies the thermometer, and the first time interval is a range of time interval (1 h, 1.5 h) in which the electronic album expects to receive an event notification.

Alternatively, in the scenario as shown in FIG. 5, the method 30 may further include: sending, by the agent to the first target, a fourth subscription request including an identifier of the requester and the first time interval; sending, by the first target to the agent, a response for the fourth subscription request including the second time interval; sending, by the agent to the requester, a response for the third subscription request indicating that the agent receives an event notification from the first target according to the second time interval; sending, by the agent in response to there being no event notification received by the agent from the first target in the first time interval, an event notification of null message or cached data message to the requester; and sending, by the agent in response to there being an event notification received by the agent from the first target in the second time interval, an event notification from the first target to the requester.

Specifically, in the above example, the agent sends a fourth subscription request to the thermometer. The fourth subscription request includes a range of time interval (1 h, 1.5 h) in which the requester, which is an electronic album, expects to receive an event notification. Then, the thermometer sends a response for the fourth subscription request to the agent, including the maximum interval (Maxinterval) corresponding to the second time interval supported by the thermometer as 3 h. Then, the agent sends a response for the third subscription request to the electronic album, including the maximum interval for the agent to send an event notification as 1.5 h, which means that if the subscription is successful, an event notification will be sent to the electronic album in the time interval (1.5 h) in which the electronic album expects the event notification to be sent.

Assuming that in event cycle 1 of the electronic album (e.g., from 12:00 to 13:30 at noon), the agent receives no event notification from the thermometer, and the agent sends to the electronic album an event notification with content as null. Then, assuming that at 14:00, the agent receives an event notification from the thermometer, at which time the electronic album is already in sleep. Next, in event cycle 2 (e.g., from 14:30 to 16:00) in which the electronic album works, the agent sends the electronic album the event notification it received from the thermometer at 14:00, with content as temperature data.

As such, in a case where the hygrometer or thermometer cannot meet the request by the electronic album for subscribing to event notification, the demand of the electronic album for subscription can be met with the intermediary effect of the agent.

Alternatively, in a case where the requester chooses not to subscribe to event notification from the second target by itself, the third subscription request may further indicate that the agent receives an event notification from the second target. Indeed, the present disclosure is not limited to this.

Correspondingly, in the scenario as shown in FIG. 5, the method 30 may further include: sending, by the agent to the second target, a fifth subscription request including an identifier of the requester and the first time interval; sending, by the second target to the agent, a response for the fifth subscription request including the third time interval; sending, by the agent to the requester, a response for the third subscription request indicating that the agent receives an event notification from the second target according to the third time interval; sending, by the agent in response to there being an event notification received by the agent from the second target in the first time interval, an event notification from the second target to the requester.

Specifically, in the above example, the agent sends a fourth subscription request to the thermometer and a fifth subscription request to the hygrometer. The fourth subscription request and the fifth subscription request each include a range of time interval (1 h, 1.5 h) in which the requester, which is an electronic album, expects to receive an event notification. Then, the thermometer sends a response for the fourth subscription request to the agent, including the maximum interval (Maxinterval) corresponding to the second time interval supported by the thermometer as 3 h. The hygrometer sends a response for the fifth subscription request to the agent, including the maximum interval (Maxinterval) corresponding to the third time interval supported by the hygrometer as 1.5 h. Then, the agent sends a response for the third subscription request to the electronic album, including the maximum interval for the agent to send an event notification as 1.5 h, which means that if the subscription is successful, an event notification will be sent to the electronic album in the time interval (1.5 h) in which the electronic album expects the event notification to be sent.

Assuming that in event cycle 1 of the electronic album (e.g., from 12:00 to 13:30 at noon), the agent receives no event notification from the thermometer but receives an event notification from the hygrometer, and the agent sends to the electronic album an event notification with content as humidity data. Then, assuming that at 14:00, the agent receives an event notification from the thermometer, at which time the electronic album is already in sleep. Next, in event cycle 2 (e.g., from 14:30 to 16:00) in which the electronic album works, the agent sends the electronic album the event notification it received from the thermometer at 14:00, with content as temperature data.

As such, in a case where the hygrometer or thermometer cannot meet the request by the electronic album for subscribing to event notification, the demand of the electronic album for subscription can be met with the intermediary effect of the agent.

As such, according to FIG. 3 and FIG. 5, alternatively, in aspect 1 as detailed above, the target includes a first target and a second target, the first target is able to send an event notification in the second time interval, the second target is able to send an event notification in a third time interval, and the requester is further configured to: send, in response to determining that the second time interval exceeds the first time interval, a subscription request to the agent, to request the agent to receive event notification from the first target and notify the requester according to the first time interval; and send, in response to determining that the third time interval does not exceed the first time interval, a second subscription request to the second target, to receive an event notification from the second target.

Correspondingly, according to FIG. 3 and FIG. 5, aspect 4 of the embodiments of the present disclosure further provides a system for subscription management in an Internet of Things. The system includes a requester, a target, and an agent. In aspect 4, the requester sends to the first target and the second target a first subscription request and a second subscription request, respectively, both indicating that the requester expects to receive an event notification in the first time interval; the requester receives from the first target a response for the first subscription request indicating that the first target is able to send an event notification in the second time interval; the requester receives from the second target a response for the second subscription request indicating that the first target is able to send an event notification in the third time interval; the requester determines whether the second time interval exceeds the first time interval and whether the third time interval exceeds the first time interval; the requester sends, in response to determining that the second time interval exceeds the first time interval, a third subscription request to the agent, where the third subscription request indicates that the agent receives an event notification from the first target, and includes the first time interval; the agent sends to the first target a fourth subscription request including an identifier of the requester and the first time interval; the first target sends to the agent a response for the fourth subscription request including the second time interval; the agent sends to the requester a response for the third subscription request indicating that the agent receives an event notification from the first target according to the second time interval; the agent sends, in response to there being no event notification received by the agent from the first target in the first time interval, an event notification of null message or cached data message to the requester; and the agent sends, in response to there being an event notification received by the agent from the first target in the second time interval, an event notification from the first target to the requester according to the first time interval. Indeed, the present disclosure is not limited to this.

Figure 6:
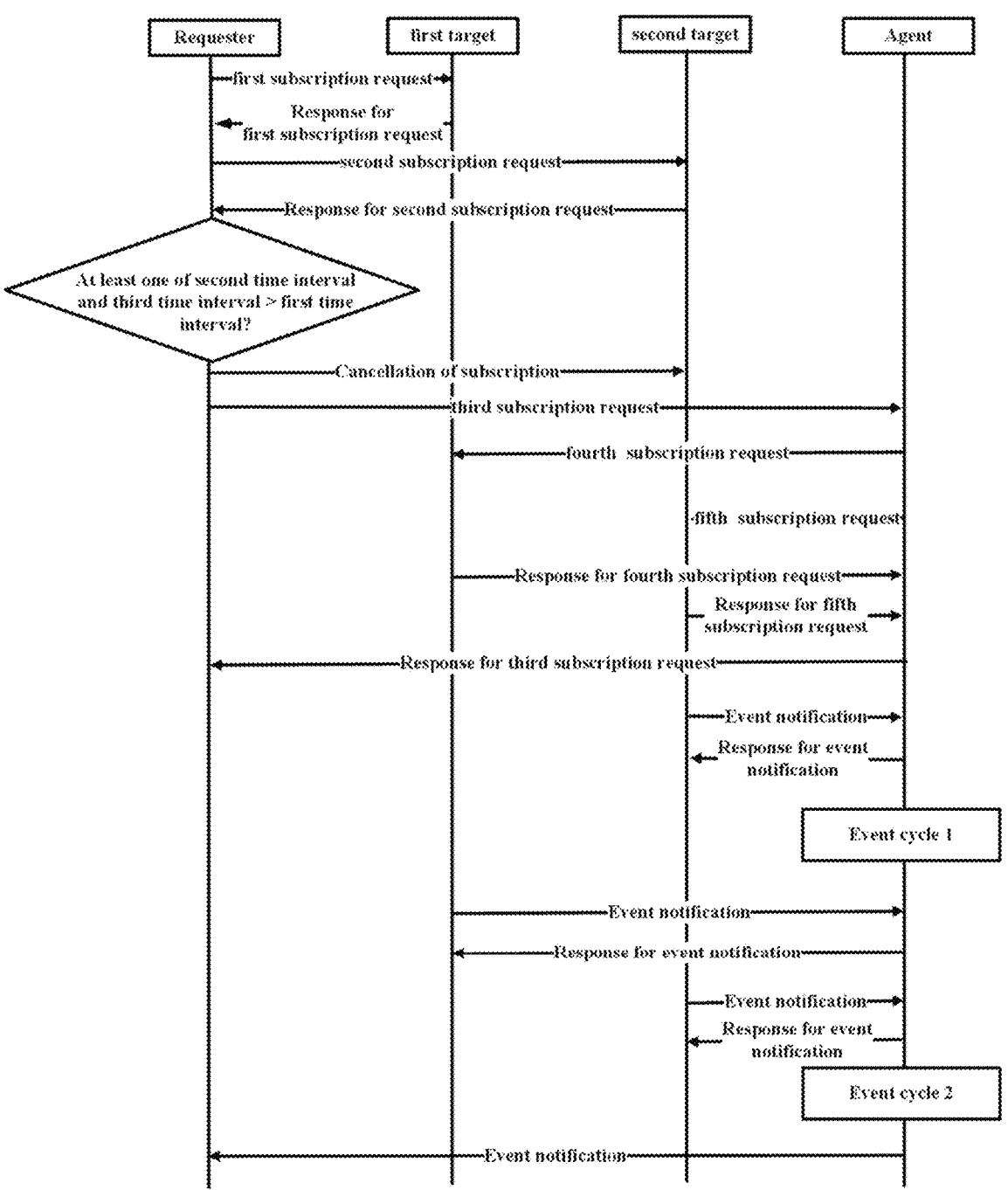
FIG. 6 is another schematic diagram showing interaction among a requester, a first target, a second target and an agent in an Internet of Things according to an embodiment of the present disclosure.

FIG. 6 is another schematic diagram showing interaction among a requester, a first target, a second target, and an agent in an Internet of Things according to an embodiment of the present disclosure. The example scenario where the method 30 is applied as shown in FIG. 6 relates to a situation where the requester needs to jointly subscribe from a plurality of targets. In the current interactive flow of subscribing to notification, if some of the plurality of targets are not able to send in a range of the time interval as expected by the requester, the effect of subscription will be affected, causing failure in subscription. To this end, by applying the method 30 in the scenario as shown in FIG. 6, the requester can subscribe to data from the agent, and after receiving all the subscription data of the targets, the agent can package and send it to the requester, which better facilitates the requester to realize a subscription process, and saves the resource occupation by the requester.

Specifically, in the example scenario where the method 30 is applied as shown in FIG. 6, the method 30 is implemented by the requester, the target in the method 30 includes a first target and a second target, the first target is able to send an event notification in the second time interval, and the second target is able to send an event notification in a third time interval.

For example, in the example scenario where the method 30 is applied as shown in FIG. 6, the method 30 further includes: receiving, by the agent in response to determining that the second time interval exceeds the first time interval, an event notification from the first target according to the second time interval; receiving, by the agent in response to determining that the third time interval does not exceed the first time interval, an event notification from the second target according to the third time interval; sending, by the agent event, notifications from the first target and the second target to the requester according to the first time interval.

Specifically, as shown in FIG. 6, in step S301, the requester sends a first subscription request and a second subscription request to the first target and the second target, where the first subscription request and the second subscription request indicate that the requester expects to receive an event notification in the first time interval; the requester receives from the first target a response for the first subscription request indicating that the first target is able to send an event notification in the second time interval; the requester receives from the second target a response for the second subscription request indicating that the first target is able to send an event notification in the third time interval.

An example is taken where the requester is an electronic album, the first target is an environmental thermometer and the second target is an environmental hygrometer. The range of the time interval in which the electronic album expects to receive an event notification is (1 h, 1.5 h), and the electronic album will start to sleep if the 1.5 h is exceeded. An inherent maximum interval threshold built in the thermometer for sending an event notification is 3 h, and an inherent maximum interval threshold built in the hygrometer for sending an event notification is 1.5 h. In the above step S301, the electronic album sends a subscription request to the environmental thermometer and the environmental hygrometer, including a first time interval (1 h, 1.5 h) in which the electronic album expects to receive an event notification, where the maximum interval threshold (Max interval ceiling) corresponding to the first time interval is 1.5 hours, and the minimum interval threshold (Min interval) is 1 hour. After receiving the subscription request, the environmental thermometer sends a subscription reply to the electronic album, including the maximum interval threshold (Max interval-1) corresponding to the second time interval supported by the thermometer for sending an event notification as 3 hours. After receiving the subscription request, the environmental hygrometer sends a subscription reply to the electronic album, including the maximum interval threshold (Max interval-2) corresponding to the third time interval supported by the hygrometer for sending an event notification as 1.5 hours. The electronic album needs to jointly update the measurement data of the thermometer and the hygrometer.

Next, in step S302, the requester determines whether the second time interval exceeds the first time interval and whether the third time interval exceeds the first time interval. For example, after receiving the subscription reply, the electronic album determines whether the maximum interval (Max interval-1)>the maximum interval threshold (Max Interval ceiling) of the electronic album, and whether Max interval-2<=Max Interval ceiling. It can be seen that at this time, the time interval of at least one of the thermometer and the hygrometer exceeds the first time interval, and it becomes necessary to delegate an agent for joint subscription. At this time, in this case, the requester may send to the second target a message indicating cancellation of subscription, to prevent the second target from returning an event notification directly to the requester.

Therefore, in step S303, in response to determining that the second time interval exceeds the first time interval, the requester sends to the agent a third subscription request, where the third subscription request indicates that the agent receives event notifications from the first target and the second target, and includes the first time interval.

In the above example, since 3 h>1.5 h, it can be seen that the second time interval exceeds the first time interval. The electronic album sends a third subscription request to the agent. The third subscription request includes an identifier of the requester, an identifier of the first target, an identifier of the second target, and a second time interval. At this time, the identifier of the requester indicates that the agent deputizes for the subscription management of the electronic album, the identifier of the first target identifies the thermometer, the identifier of the second target identifies the hygrometer, and the first time interval is a range of time interval (1 h, 1.5 h) in which the electronic album expects to receive an event notification.

Alternatively, in the scenario as shown in FIG. 6, the method 30 may further include: sending, by the agent to the first target, a fourth subscription request including an identifier of the requester and the first time interval; sending, by the first target to the agent, a response for the fourth subscription request including the second time interval; sending, by the agent to the second target, a fifth subscription request including an identifier of the requester and the first time interval; sending, by the second target to the agent, a response for the fifth subscription request including the third time interval; sending, by the agent to the requester, a response for the third subscription request indicating that the agent receives an event notification from the first target according to the second time interval and receives an event notification from the first target according to the third time interval; sending by the agent in response to there being no event notification received from the first target but an event notification received from the second target by the agent in the first time interval, an event notification of null message or cached data message to the requester; and sending by the agent in response to there being an event notification received by the agent from the first target in the second time interval, the event notifications from the first target and the second target to the requester.

Specifically, in the above example, the agent sends a fourth subscription request to the thermometer and a fifth subscription request to the hygrometer. The fourth subscription request and the fifth subscription request each includes a range of time interval (1 h, 1.5 h) in which the requester, which is an electronic album, expects to receive an event notification. Then, the thermometer sends a response for the fourth subscription request to the agent, including the maximum interval (Maxinterval) corresponding to the second time interval supported by the thermometer as 3 h. The hygrometer sends a response for the fifth subscription request to the agent, including the maximum interval (Maxinterval) corresponding to the third time interval supported by the hygrometer as 1.5 h. Then, the agent sends a response for the third subscription request to the electronic album, including the maximum interval for the agent to send an event notification as 1.5 h, which means that if the subscription is successful, an event notification will be sent to the electronic album in the time interval (1.5 h) in which the electronic album expects the event notification to be sent.

Assuming that in event cycle 1 of the electronic album (e.g., from 12:00 to 13:30 at noon), the agent receives no event notification from the thermometer but receives an event notification from the hygrometer at 13:30, the agent may send to the electronic album an event notification with content as null. Alternatively, the agent may not send any message to the electronic album during this period. Then, assuming that at 14:00, the agent receives an event notification from the thermometer, at which time the electronic album is already in sleep. Next, in event cycle 2 (e.g., from 14:30 to 16:00) in which the electronic album works, the agent sends the electronic album the event notification it received from the thermometer at 14:00 and the event notification it received from the hygrometer at 13:30, with content as temperature data and humidity data. In addition, if the agent receives another humidity data at 15:00, the agent will send a piece of temperature data and two pieces of humidity data to the requester in event cycle 2 (e.g., from 14:30 to 16:00) in which the electronic album works. Indeed, the present disclosure is not limited to this.

As such, in a case where the hygrometer or thermometer cannot meet the request by the electronic album for jointly subscribing to event notification, the demand of the electronic album for subscription can be met with the intermediary effect of the agent.

Alternatively, according to FIG. 3 and FIG. 6, in aspect 1 as detailed above, the target includes a first target and a second target, the first target is able to send an event notification in the second time interval, the second target is able to send an event notification in a third time interval, and the requester is further configured to: send a subscription request to the agent, to request the agent to receive event notifications from the first target and the second target and notify the requester according to the first time interval.

Correspondingly, according to FIG. 3 and FIG. 6, in aspect 2 as detailed above, the target includes a first target and a second target, the first target is able to send an event notification in the second time interval, the second target is able to send an event notification in a third time interval, and the agent is further configured to: receive from the requester a subscription request, where the subscription request indicates that the agent receives event notifications from the first target and the second target, as well as a first time interval which is a time interval in which the requester expects to receive an event notification from the agent, where at least one of the second time interval and the third time interval exceeds the first time interval.

Correspondingly, according to FIGS. 3 and 6, aspect 5 of the embodiments of the present disclosure further provides a system for subscription management in an Internet of Things. The system includes a requester, a first target, a second target and an agent. In aspect 5, the requester sends to the first target and the second target a first and a second subscription request indicating that the requester expects to receive an event notification in the first time interval; the requester receives from the first target a response for the first subscription request indicating that the first target is able to send an event notification in the second time interval; the requester receives from the second target a response for the second subscription request indicating that the first target is able to send an event notification in the third time interval; the requester determines whether the second time interval exceeds the first time interval and whether the third time interval exceeds the first time interval; the requester sends, in response to determining that the second time interval exceeds the first time interval, a third subscription request to the agent, the third subscription request indicating that the agent receives event notifications from the first target and the second target, and includes the first time interval; the agent sends to the first target a fourth subscription request including an identifier of the requester and the first time interval; the first target sends to the agent a response for the fourth subscription request including the second time interval; the agent sends to the second target a fifth subscription request including an identifier of the requester and the first time interval; the second target sends to the agent a response for the fifth subscription request including the third time interval; the agent sends to the requester a response for the third subscription request indicating that the agent receives an event notification from the first target according to the second time interval and receives an event notification from the first target according to the third time interval; the agent sends, in response to there being no event notification received from the first target but an event notification received from the second target by the agent in the first time interval, an event notification of null message or cached data message to the requester; and the agent sends, in response to there being an event notification received by the agent from the first target in the second time interval, the event notifications from the first target and the second target to the requester.

Figure 7:
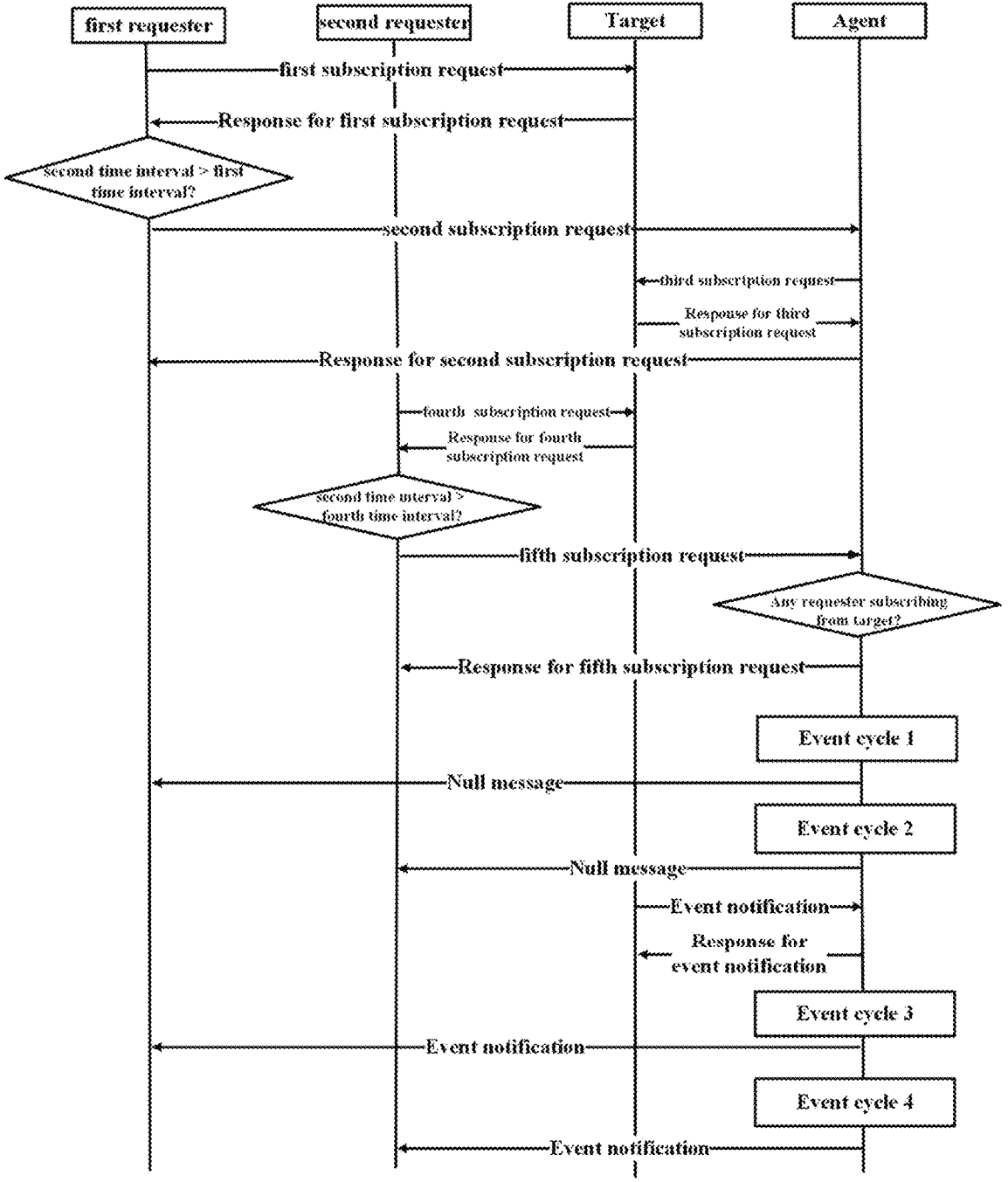
FIG. 7 is a schematic diagram showing interaction among a first requester, a second requester, a target and an agent in an Internet of Things according to an embodiment of the present disclosure.

FIG. 7 is a schematic diagram showing interaction among a first requester, a second requester, a target, and an agent in an Internet of Things according to an embodiment of the present disclosure. The example scenario where the method 30 is applied as shown in FIG. 7 relates to a situation where a plurality of requesters need to subscribe from a single target. In the current interactive flow of subscribing to notification, if the target cannot meet the needs of the plurality of requesters, it results in that the plurality of requesters cannot acquire subscription data in time. To this end, by respective requesters performing the method 30 in the scenario as shown in FIG. 7, once a certain requester and the target do not match in terms of time, the requester may subscribe to data from the agent, and the agent determines that there is another requester subscribing to data from the same target subsequently, then subscribes to data from the target once, and sends the data according to the range of time interval as expected by different requesters.

Specifically, in the example scenario where the method 30 is applied as shown in FIG. 7, steps S301 to S303 in the method 30 are implemented by the first requester. The first subscription request is from a first requester. The method 30 further includes: sending, by the second requester to the agent, a third subscription request indicating that the agent receives an event notification from the target in a fourth time interval; determining whether the second time interval exceeds the fourth time interval; receiving, by the agent in response to determining that the second time interval does not exceed the fourth time interval, an event notification from the target according to the fourth time interval and notifying the second requester according to the fourth time interval; and receiving, by the agent in response to determining that the second time interval exceeds the fourth time interval, an event notification from the target according to the second time interval and notifying the second requester according to the fourth time interval.

Specifically, as shown in FIG. 7, in step S301, the first requester sends to the target a first subscription request indicating that the first requester expects to receive an event notification in the first time interval; the first requester receives from the target a response for the first subscription request indicating that the target is able to send an event notification in the second time interval.

An example is taken where the first requester is an electronic album A and the target is an environmental thermometer. The range of the time interval in which the electronic album expects to receive an event notification is (1 h, 1.5 h), and the electronic album will start to sleep if the 1.5 h is exceeded, and an inherent maximum interval threshold built in the thermometer for sending an event notification is 3 h. In the above step S301, the electronic album sends a subscription request to the environmental thermometer, including the first time interval (1 h, 1.5 h) in which the electronic album expects to receive an event notification, where the maximum interval threshold (Max interval) corresponding to the first time interval is 1.5 hours, and the minimum interval threshold (Min interval) is 1 hour. After receiving the subscription request, the environmental thermometer sends a subscription reply to the electronic album, including the maximum interval threshold (Max interval) corresponding to the second time interval supported by the thermometer for sending an event notification as 3 hours.

Then, in step S302, the first requester determines whether the second time interval exceeds the first time interval. The above example in continued where the first requester is an electronic album A and the target is an environmental thermometer. After receiving the subscription reply, the electronic album A determines whether the maximum interval threshold (Max interval) corresponding to the first time interval is greater than the maximum interval threshold (Max interval ceiling) corresponding to the second time interval.

Next, in step S303, in response to determining that the second time interval exceeds the first time interval, the first requester sends to the agent a second subscription request, where the second subscription request indicates that the agent receives an event notification from the target, and includes the first time interval.

In the above example, since 3 h>1.5 h, it can be seen that the second time interval exceeds the first time interval. The electronic album A sends a second subscription request to the agent. The second subscription request includes an identifier of the first requester, an identifier of the target, and a second time interval. At this time, the identifier of the first requester indicates that the agent deputizes for the subscription management of the electronic album A, the identifier of the target identifies the thermometer, and the first time interval is a range of time interval (1 h, 1.5 h) in which the electronic album A expects to receive an event notification.

Alternatively, in the scenario as shown in FIG. 7, the method 30 may further include: sending, by the agent to the target a third subscription request including an identifier of the first requester and the first time interval; sending, by the target to the agent, a response for the third subscription request including the second time interval; sending, by the agent to the first requester, a response for the second subscription request indicating that the agent receives an event notification from the target.

Specifically, in the above example, the agent sends a third subscription request to the thermometer. The third subscription request includes a range of time interval (1 h, 1.5 h) in which the first requester, which is an electronic album A, expects to receive an event notification. Then, the thermometer sends a response for the third subscription request to the agent, including the maximum interval (Maxinterval) corresponding to the second time interval supported by the thermometer as 3 h. Then, the agent sends a response for the first subscription request to the electronic album A, including the maximum interval for the agent to send an event notification as 1.5 h, which means that if the subscription is successful, an event notification will be sent to the electronic album A in the range of time interval (1.5 h) in which the electronic album A expects the event notification to be sent.

Next, in the scenario as shown in FIG. 7, the method 30 may further include: sending, by the second requester to the target, a fourth subscription request indicating that the second requester expects to receive an event notification in the fourth time interval. Next, the second requester receives from the target a response for the fourth subscription request indicating that the target is able to send an event notification in the second time interval.

An example is taken where the second requester is an electronic album B and the target is an environmental thermometer. The range of the time interval in which the electronic album B expects to receive an event notification is (1 h, 2 h), and the electronic album B will start to sleep if the 2 h is exceeded, and an inherent maximum interval threshold built in the thermometer for sending an event notification is 3 h. In the above step S301, the electronic album B sends a subscription request to the environmental thermometer, including a fourth time interval (1 h, 2 h) in which the electronic album B expects to receive an event notification, where the maximum interval threshold (Max interval) corresponding to the fourth time interval is 1.5 hours and the minimum interval threshold (Min interval) is 1 hour. After receiving the subscription request, the environmental thermometer sends a subscription reply to the electronic album B, including the maximum interval threshold (Max interval) corresponding to the second time interval supported by the thermometer for sending an event notification as 3 hours.

Next, in the scenario as shown in FIG. 7, the method 30 may further include: determining, by the second requester, whether the second time interval exceeds the fourth time interval. Next, in response to determining that the second time interval exceeds the fourth time interval, the second requester sends to the agent a fifth subscription request, where the fifth subscription request indicates that the agent receives an event notification from the target, and includes the fourth time interval.

The above example is continued where the second requester is an electronic album B and the target is an environmental thermometer. After receiving the subscription reply, the electronic album B determines whether the maximum interval threshold (Max interval) corresponding to the fourth time interval is greater than the maximum interval threshold (Max interval ceiling) corresponding to the second time interval. Since 3 h>2 h, it can be seen that the second time interval exceeds the fourth time interval. The electronic album B sends a fifth subscription request to the agent. The fifth subscription request includes an identifier of the second requester, an identifier of the target, and a second time interval. At this time, the identifier of the second requester indicates that the agent deputizes for the subscription management of the electronic album B, the identifier of the target identifies the thermometer, and the fourth time interval is a range of time interval (1 h, 2 h) in which the electronic album B expects to receive an event notification.

Next, in the scenario as shown in FIG. 7, the method 30 may further include: determining, by the agent, whether there has been a requester subscribing to event notification from the target; sending, by the agent in response to that there has been a requester subscribing to event notification from the target, a response for the fifth subscription request to the second requester.

Specifically, in the above example, the agent determines that there has being the first requester (electronic album A) subscribing to event notification from the target (thermometer). Then, the agent sends a response for the fifth subscription request to the electronic album B, including the maximum interval for the agent to send an event notification as 2 h, which means if the subscription is successful, an event notification will be sent to the electronic album B in the range of time interval (2 h) in which the electronic album B expects the event notification to be sent.

Assuming that in event cycle 1 related to the electronic album A (e.g., from 12:00 to 13:30 at noon), the agent receives no event notification from the thermometer, and the agent may send to the electronic album A an event notification with content as null. In event cycle 2 related to the electronic album B (e.g., from 12:00 to 14:00 at noon), the agent receives no event notification from the thermometer, and the agent may send to the electronic album B an event notification with content as null. Then, assuming that at 14:15, the agent receives an event notification from the thermometer, at which time both the electronic album A and the electronic album B are already in sleep. Next, in event cycle 3 related to the electronic album A (e.g., from 14:30 to 16:00), the agent sends the electronic album A the event notification it received from the thermometer at 14:15, with content as temperature data. In event cycle 3 related to the electronic album B (e.g., from 15:00 to 17:00), the agent sends to the electronic album B the event notification it received from the thermometer at 14:15, with content as temperature data. As such, in a case where the thermometer cannot meet the requests by the electronic album A and the electronic album B for subscribing to event notification, the demands of the electronic album A and the electronic album B for subscription can be met with the intermediary effect of the agent.

As such, according to FIG. 3 and FIG. 7, in aspect 2 of the embodiments of the present disclosure, the agent is further configured to: receive from the second requester a third subscription request, where the third subscription request indicates that the agent receives an event notification from the target, as well as a fourth time interval which is a time interval in which the second requester expects to receive an event notification from the agent; and send to the second requester a response for the first subscription request indicates that the agent receives an event notification from the target and sends an event notification to the requester according to the fourth time interval.

Correspondingly, according to FIG. 3 and FIG. 7, aspect 6 of the embodiments of the present disclosure further provides a system for subscription management in an Internet of Things. The system includes a first requester, a second requester, a target and an agent. In aspect 6, the first requester sends to the target a first subscription request indicating that the first requester expects to receive an event notification in the first time interval; the first requester receives from the target a response for the first subscription request indicating that the target is able to send an event notification in the second time interval; the first requester determines whether the second time interval exceeds the first time interval; the first requester sends, in response to determining that the second time interval exceeds the first time interval, to the agent a second subscription request, where the second subscription request indicates that the agent receives an event notification from the target, and includes the first time interval; the agent sends to the target a third subscription request including an identifier of the first requester and the first time interval; the target sends to the agent a response for the third subscription request including the second time interval; the agent sends to the first requester a response for the second subscription request indicating that the agent receives an event notification from the target; the second requester sends to the target a fourth subscription request indicating that the second requester expects to receive an event notification in the fourth time interval; the second requester receives from the target a response for the fourth subscription request indicating that the target is able to send an event notification in the second time interval; the second requester determines whether the second time interval exceeds the fourth time interval; the second requester sends, in response to determining that the second time interval exceeds the fourth time interval, to the agent a fifth subscription request, where the fifth subscription request indicates that the agent receives an event notification from the target, and includes the fourth time interval; the agent determines whether there has been a requester subscribing to event notification from the target; the agent sends, in response to that there has been a requester subscribing to event notification from the target, a response for the fifth subscription request to the second requester.

Figure 8:
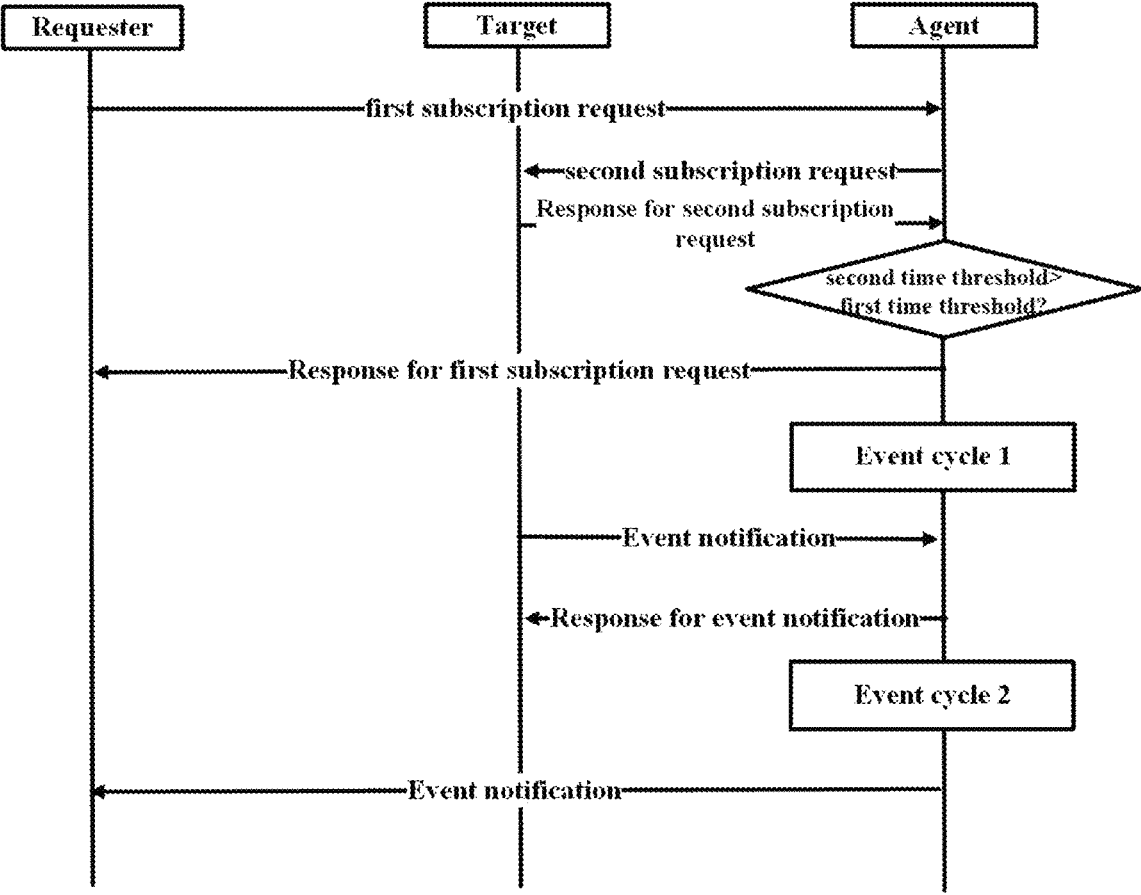
FIG. 8 is a schematic diagram showing interaction among a requester, a target and an agent in an Internet of Things according to an embodiment of the present disclosure.

FIG. 8 is a schematic diagram showing interaction among a requester, a target, and an agent in an Internet of Things according to an embodiment of the present disclosure, where the agent implements the method 30. In the scenario as shown in FIG. 8, the requester may entrust all subscription requests to the agent for processing. When event notification is needed to be subscribed, the requester first sends a subscription request to the agent, and then the agent determines whether it needs to perform a proxy subscription from the target. This can decrease the determination processes of the requester, reduce the power consumption of the requester, and make the subscription process simpler.

As shown in FIG. 8, in step S301, the agent receives from the requester a first subscription request indicating that the requester expects to receive an event notification in the first time interval; the agent sends to the target a second subscription request indicating that the agent expects to receive an event notification in the first time interval; and the agent receives from the target a response for the second subscription request indicating that the target is able to send an event notification in the second time interval.

An example is taken where the requester is an electronic album and the target is an environmental thermometer. The range of the time interval in which the electronic album expects to receive an event notification is (1 h, 1.5 h), and the electronic album will start to sleep if the 1.5 h is exceeded, and an inherent maximum interval threshold built in the thermometer for sending an event notification is 3 h. In the above step S301, the electronic album sends a first subscription request to the agent. Alternatively, the first subscription request includes an identifier of the requester (which, for example, indicates that the requester is an electronic album), an identifier of the target (which, for example, indicates that the target is a thermometer), and a first time interval (1 h, 1.5 h) in which the requester expects to receive an event notification. The agent sends a second subscription request to the thermometer. Alternatively, the second subscription request includes an identifier of the requester (which, for example, indicates that the requester is an electronic album) and the first time interval (1 h, 1.5 h) in which the requester expects to receive an event notification. After receiving the second subscription request, the environmental thermometer sends a response for the second subscription request to the agent, including the maximum interval threshold (Max interval) corresponding to the second time interval supported by the thermometer for sending an event notification as 3 hours. Indeed, the present disclosure is not limited to this.

Then, in step S302, the agent determines whether the second time interval exceeds the first time interval. The above example is continued where the requester is an electronic album and the target is an environmental thermometer. After receiving the response for the second subscription request, the agent determines whether the maximum interval threshold (Max interval) corresponding to the first time interval is greater than the maximum interval threshold (Max interval ceiling) corresponding to the second time interval.

Next, in step S303, in response to determining that the second time interval exceeds the first time interval, the agent receives an event notification from the target according to the second time interval and notifies the requester according to the first time interval.

In the above example, since 3 h>1.5 h, it can be seen that the second time interval exceeds the first time interval. The agent sends a subscription reply to the electronic album, including the maximum time interval for the agent to send an event notification as 1.5 h, which means that the subscription is successful. At this time, the agent may send an event notification to the electronic album in the range of time interval (1.5 h) in which the electronic album expects to send the event notification.

Alternatively, in the scenario as shown in FIG. 8, the method 30 may further include: sending, by the agent in response to there being no event notification received by the agent from the target in the first time interval, an event notification of null message or cached data message to the requester; and sending, by the agent in response to there being an event notification received by the agent from the target in the second time interval, an event notification containing the latest data of the target to the requester.

Assuming that in event cycle 1 of the electronic album (e.g., from 12:00 to 13:30 at noon), the agent receives no event notification from the thermometer, and the agent sends to the electronic album an event notification with content as null. Then, assuming that at 14:00, the agent receives an event notification from the thermometer, at which time the electronic album is already in sleep. Next, in event cycle 2 (e.g., from 14:30 to 16:00) in which the electronic album works, the agent sends the electronic album the event notification it received from the thermometer at 14:00, with content as temperature data.

As such, in a case where the thermometer cannot meet the request by the electronic album for subscribing to event notification, the demand of the electronic album for subscription can be met with the intermediary effect of the agent.

According to FIG. 3 and FIG. 8, aspect 7 of the embodiments of the present disclosure further provides an agent in an Internet of Things system. The agent is configured to: receive, from the requester, a first subscription request indicating that the requester expects to receive an event notification in the first time interval; send, to the target, a second subscription request indicating that the agent expects to receive an event notification in the first time interval; and receive, from the target, a response for the second subscription request indicating that the target is able to send an event notification in the second time interval; determine whether the second time interval exceeds the first time interval; receive, in response to determining that the second time interval exceeds the first time interval, an event notification from the target according to the second time interval and notifying the requester according to the first time interval; send, in response to there being no event notification received by the agent from the target in the first time interval, an event notification of null message or cached data message to the requester; and send, in response to there being an event notification received by the agent from the target in the second time interval, an event notification containing the latest data of the target to the requester.

Figure 9:
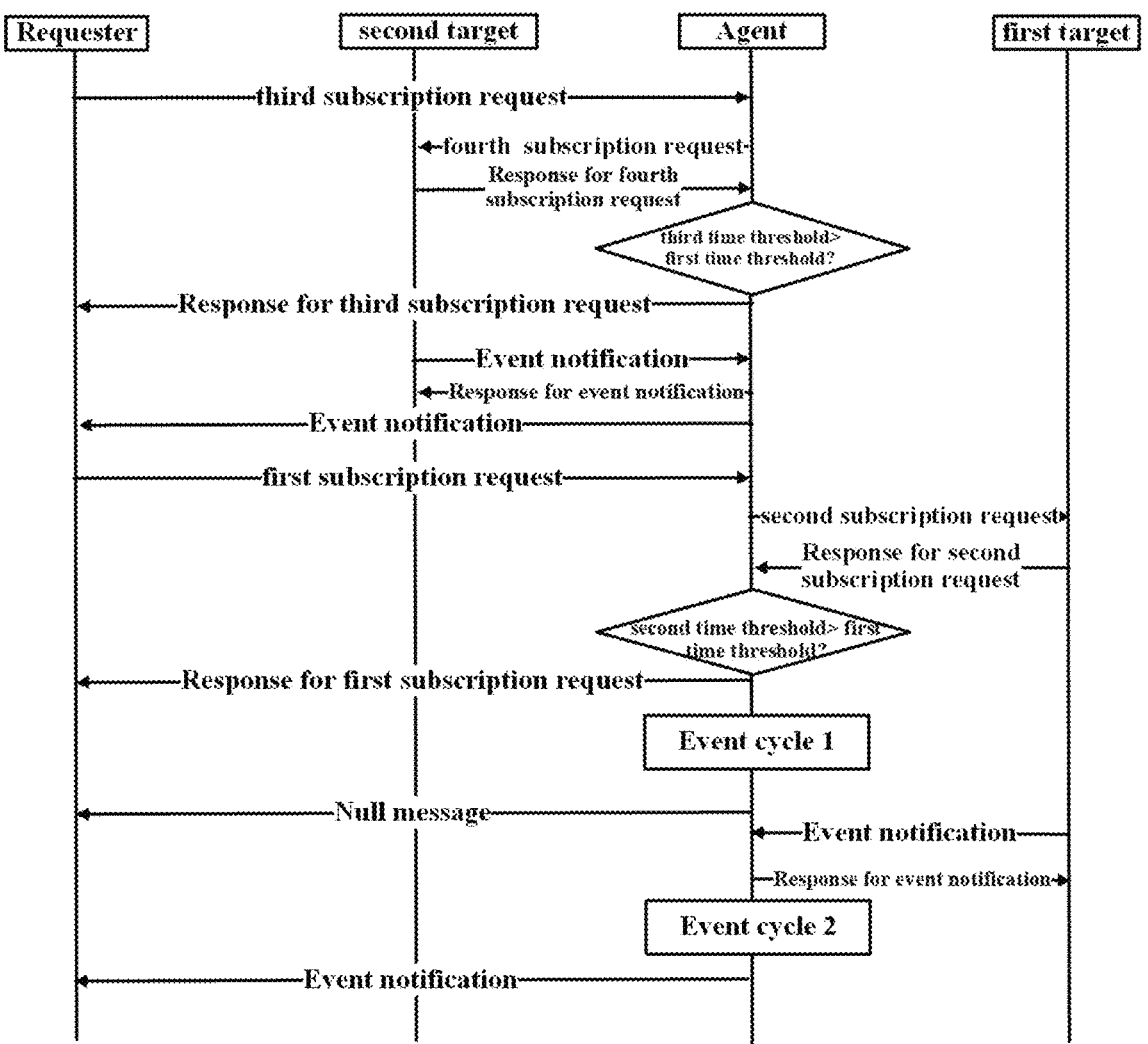
FIG. 9 is a schematic diagram showing interaction among a requester, a first target, a second target and an agent in an Internet of Things according to an embodiment of the present disclosure.

FIG. 9 is a schematic diagram showing interaction among a requester, a first target, a second target, and an agent in an Internet of Things according to an embodiment of the present disclosure, where the agent implements the method 30. In the scenario as shown in FIG. 9, the requester may entrust all the subscription requests for the plurality of targets to the agent for processing. When a event notification is needed to be subscribed, the requester first sends a subscription request to the agent, and then the agent determines whether it needs to perform proxy subscription from such targets. Applying the method 30 in combination with the scenario as shown in FIG. 9 can decrease the determination processes of the requester, reduce the power consumption of the requester, and make the subscription process simpler.

Alternatively, as shown in FIG. 9, the target in the method 30 includes a first target and a second target, the first target is able to send an event notification in the second time interval, and the second target is able to send an event notification in a third time interval.

Alternatively, before the agent performs the method 30 as shown in FIG. 8, the agent may further perform the following operations to realize the subscription to event notification from the second target.

As shown in FIG. 9, the agent receives from the requester a third subscription request indicating that the requester expects to receive an event notification in the first time interval; the agent sends to the second target a fourth subscription request indicating that the agent expects to receive an event notification in the first time interval; and the agent receives from the second target a response for the fourth subscription request indicating that the second target is able to send an event notification in the third time interval.

An example is taken where the requester is an electronic album and the second target is an environmental hygrometer. The range of the time interval in which the electronic album expects to receive an event notification is (1 h, 1.5 h), and the electronic album will start to sleep if the 1.5 h is exceeded, and an inherent maximum interval threshold built in the hygrometer for sending an event notification is 1.25 h. In the above step S301, the electronic album sends a third subscription request to the agent. Alternatively, the third subscription request includes an identifier of the requester (which, for example, indicates that the requester is an electronic album), an identifier of the second target (which, for example, indicates that the second target is a hygrometer), and a first time interval (1 h, 1.5 h) in which the requester expects to receive an event notification. The agent sends a fourth subscription request to the hygrometer. Alternatively, the fourth subscription request includes an identifier of the requester (which, for example, indicates that the requester is an electronic album) and a first time interval (1 h, 1.5 h) in which the requester expects to receive an event notification. After receiving the fourth subscription request, the environmental hygrometer sends a response for the fourth subscription request to the agent, including the maximum interval threshold (Max interval) corresponding to the third time interval supported by the hygrometer for sending an event notification as 1.25 hours. Indeed, the present disclosure is not limited to this.

Then, the agent determines whether the third time interval exceeds the first time interval. The above example is continued where the requester is an electronic album and the second target is an environmental hygrometer. After receiving the response for the fourth subscription request, the agent determines whether the maximum interval threshold (Max interval) corresponding to the first time interval is greater than the maximum interval threshold (Max interval ceiling) corresponding to the third time interval.

Next, in response to determining that the third time interval does not exceed the first time interval, the agent receives an event notification from the second target according to the third time interval and notifies the requester according to the first time interval.

In the above example, since 1.25 h<1.5 h, it can be seen that the third time interval does not exceed the first time interval. The agent sends a subscription reply to the electronic album, including the maximum time interval for the agent to send an event notification as 1.5 h, which means that the subscription is successful. At this time, the agent may send an event notification to the electronic album in the range of time interval (1.5 h) in which the electronic album expects to send the event notification.

Then, in response to there being an event notification received by the agent from the second target in the third time interval, the agent sends an event notification containing the latest data of the second target to the requester according to the first time interval.

Next, the agent will continue to perform operations similar to those in FIG. 8, including but not limited to: receiving, by the agent from the requester, a first subscription request indicating that the requester expects to receive an event notification in the first time interval; sending, by the agent to the first target, a second subscription request indicating that the agent expects to receive an event notification in the first time interval; and receiving, by the agent from the first target, a response for the second subscription request indicating that the first target is able to send an event notification in the second time interval; determining, by the agent, whether the second time interval exceeds the first time interval; receiving, by the agent in response to determining that the second time interval exceeds the first time interval, an event notification from the first target according to the second time interval and notifying the requester according to the first time interval; sending, by the agent in response to there being no event notification received by the agent from the first target in the first time interval, an event notification of null message or cached data message to the requester; and sending, by the agent in response to there being an event notification received by the agent from the first target in the second time interval, an event notification containing the latest data of the first target to the requester. An example of the first target is the thermometer as described with reference to FIG. 8. At present, the above operations have been described in detail with reference to FIG. 8, which will not be detailed by the present disclosure herein.

Figure 10:
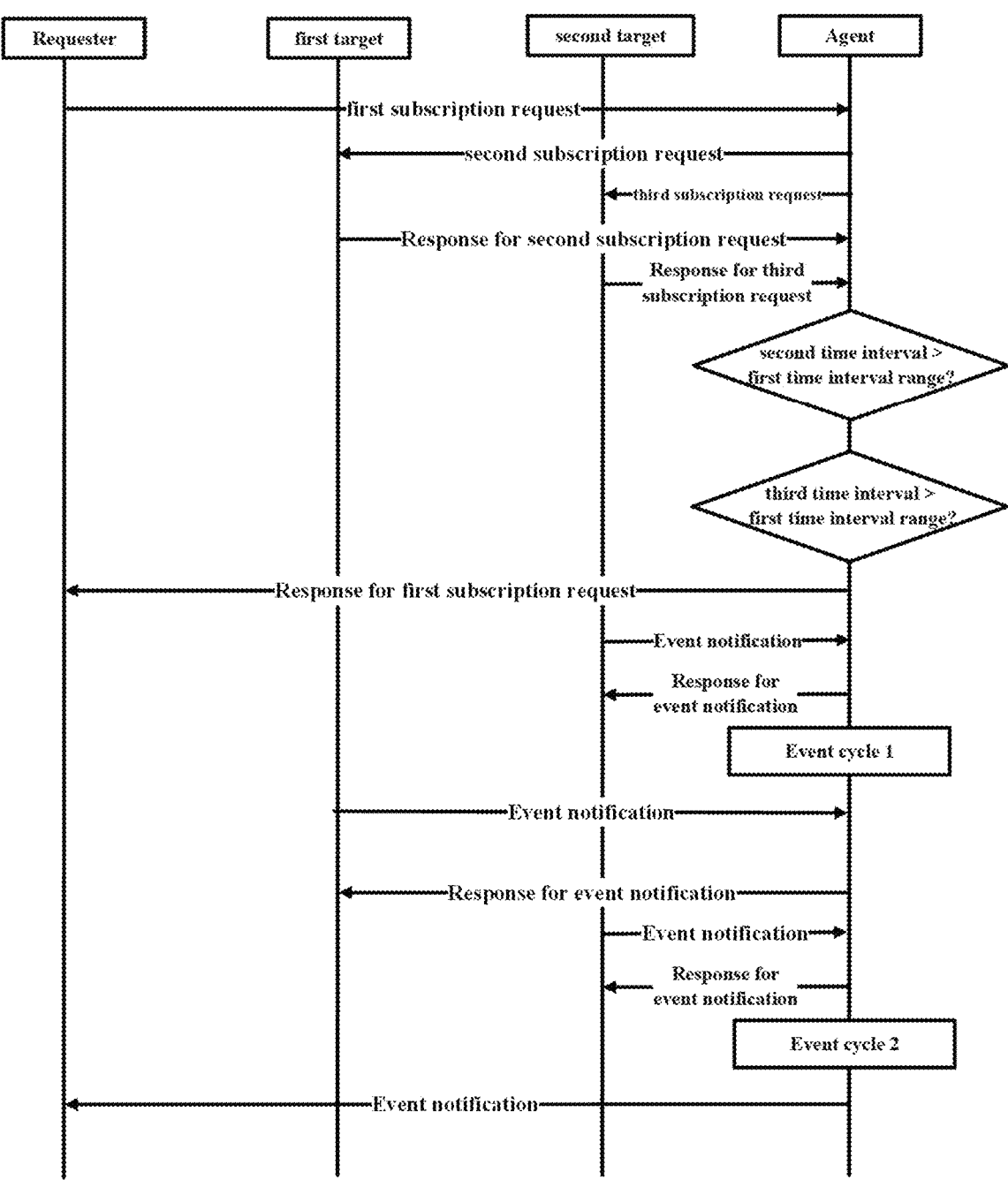
FIG. 10 is another schematic diagram showing interaction among a requester, a first target, a second target and an agent in an Internet of Things according to an embodiment of the present disclosure.

FIG. 10 is another schematic diagram showing interaction among a requester, a first target, a second target and an agent in an Internet of Things according to an embodiment of the present disclosure, where the agent implements the method 30. In the scenario as shown in FIG. 10, the requester may entrust all the subscription requests for the plurality of targets to the agent for processing, and ask the agent to package and send, after receiving event notifications from all the targets, the event notifications to the requester. At this time, the requester first sends a subscription request to the agent, and then the agent determines whether a proxy subscription is needed to be performed from such targets. Applying the method 30 in combination with the scenario as shown in FIG. 10 can decrease the determination processes of the requester, reduce the power consumption of the requester, and make the subscription process simpler.

Specifically, in the example scenario where the method 30 is applied as shown in FIG. 10, the method 30 is implemented by the agent, the target in the method 30 includes a first target and a second target, the first target is able to send an event notification in the second time interval, and the second target is able to send an event notification in a third time interval.

For example, in the example scenario where the method 30 is applied as shown in FIG. 10, the method 30 further includes: receiving, by the agent in response to determining that the second time interval exceeds the first time interval, an event notification from the first target according to the second time interval; receiving, by the agent in response to determining that the third time interval does not exceed the first time interval, an event notification from the second target according to the third time interval; sending, by the agent event, notifications from the first target and the second target to the requester according to the first time interval.

Specifically, as shown in FIG. 10, in step S301, the agent receives from the requester a first subscription request, where the first subscription request indicates that the agent receives event notifications from the first target and the second target, and includes the first time interval. The agent sends to the first target a second subscription request indicating that the agent expects to receive an event notification from the first target in the first time interval; the agent sends to the first target a third subscription request indicating that the agent expects to receive an event notification from the second target in the first time interval; the agent receives from the first target a response for the second subscription request indicating that the first target is able to send an event notification in the second time interval; the agent receives from the second target a response for the third subscription request indicating that the second target is able to send an event notification in the third time interval.

An example is taken where the requester is an electronic album, the first target is an environmental thermometer and the second target is an environmental hygrometer. The range of the time interval in which the electronic album expects to receive an event notification is (1 h, 1.5 h), and the electronic album will start to sleep if the 1.5 h is exceeded. An inherent maximum interval threshold built in the thermometer for sending an event notification is 3 h, and an inherent maximum interval threshold built in the hygrometer for sending an event notification is 1.5 h. In the above step S301, the agent sends a subscription request to the environmental thermometer and the environmental hygrometer, including a first time interval (1 h, 1.5 h) in which the agent expects to receive an event notification, where the maximum interval threshold (Max interval ceiling) corresponding to the first time interval is 1.5 hours, and the minimum interval threshold (Min interval) is 1 hour. After receiving the subscription request, the environmental thermometer sends a subscription reply to the agent, including the maximum interval threshold (Max interval-1) corresponding to the second time interval supported by the thermometer for sending an event notification as 3 hours. After receiving the subscription request, the environmental hygrometer sends a subscription reply to the agent, including the maximum interval threshold (Max interval-2) corresponding to the third time interval supported by the hygrometer for sending an event notification as 1.5 hours. The agent needs to jointly update the measurement data of the thermometer and the hygrometer.

Next, in step S302, the agent determines whether the second time interval exceeds the first time interval and whether the third time interval exceeds the first time interval.

Next, in step S303, in response to determining that at least one of the second time interval and the third time interval exceeds the first time interval, the agent receives an event notification from the target according to the second time interval and notifies the requester according to the first time interval.

For example, after receiving the subscription reply, the agent determines whether the maximum interval (Max interval-1)>the maximum interval threshold (Max Interval ceiling) for the first time interval, and whether Max interval-2<=Max Interval ceiling. It can be seen that at this time, the time interval of at least one of the thermometer and the hygrometer exceeds the first time interval, and the agent may perform a joint subscription. At this time, the agent may send a response for the first subscription request to the requester, including the maximum time interval for the agent to send an event notification as 1.5 h, which means that the subscription is successful. At this time, the agent may send an event notification to the electronic album in the range of time interval (1.5 h) in which the electronic album expects to send the event notification.

Alternatively, in the scenario as shown in FIG. 10, the method 30 may further include: sending by the agent in response to there being no event notification received from the first target but an event notification received from the second target by the agent in the first time interval, an event notification of null message or cached data message to the requester; and sending by the agent in response to there being an event notification received by the agent from the first target in the second time interval, the event notifications from the first target and the second target to the requester.

Specifically, in the above example, assuming that in event cycle 1 corresponding to the first time interval (e.g., from 12:00 to 13:30 at noon), the agent receives no event notification from the thermometer but receives an event notification from the hygrometer at 13:30, the agent may send to the electronic album an event notification with content as null. Alternatively, the agent may not send any message to the electronic album during this period. Then, assuming that at 14:00, the agent receives an event notification from the thermometer, at which time the electronic album is already in sleep. Next, in event cycle 2 (e.g., from 14:30 to 16:00) in which the electronic album works, the agent sends the electronic album the event notification it received from the thermometer at 14:00 and the event notification it received from the hygrometer at 13:30, with content as temperature data and humidity data. In addition, if the agent receives another humidity data at 15:00, the agent will send a piece of temperature data and two pieces of humidity data to the requester in event cycle 2 corresponding to the first time interval (e.g., from 14:30 to 16:00). Indeed, the present disclosure is not limited to this.

As such, in a case where the hygrometer or thermometer cannot meet the request by the electronic album for jointly subscribing to event notification, the demand of the electronic album for subscription can be met with the intermediary effect of the agent.

Figure 11:
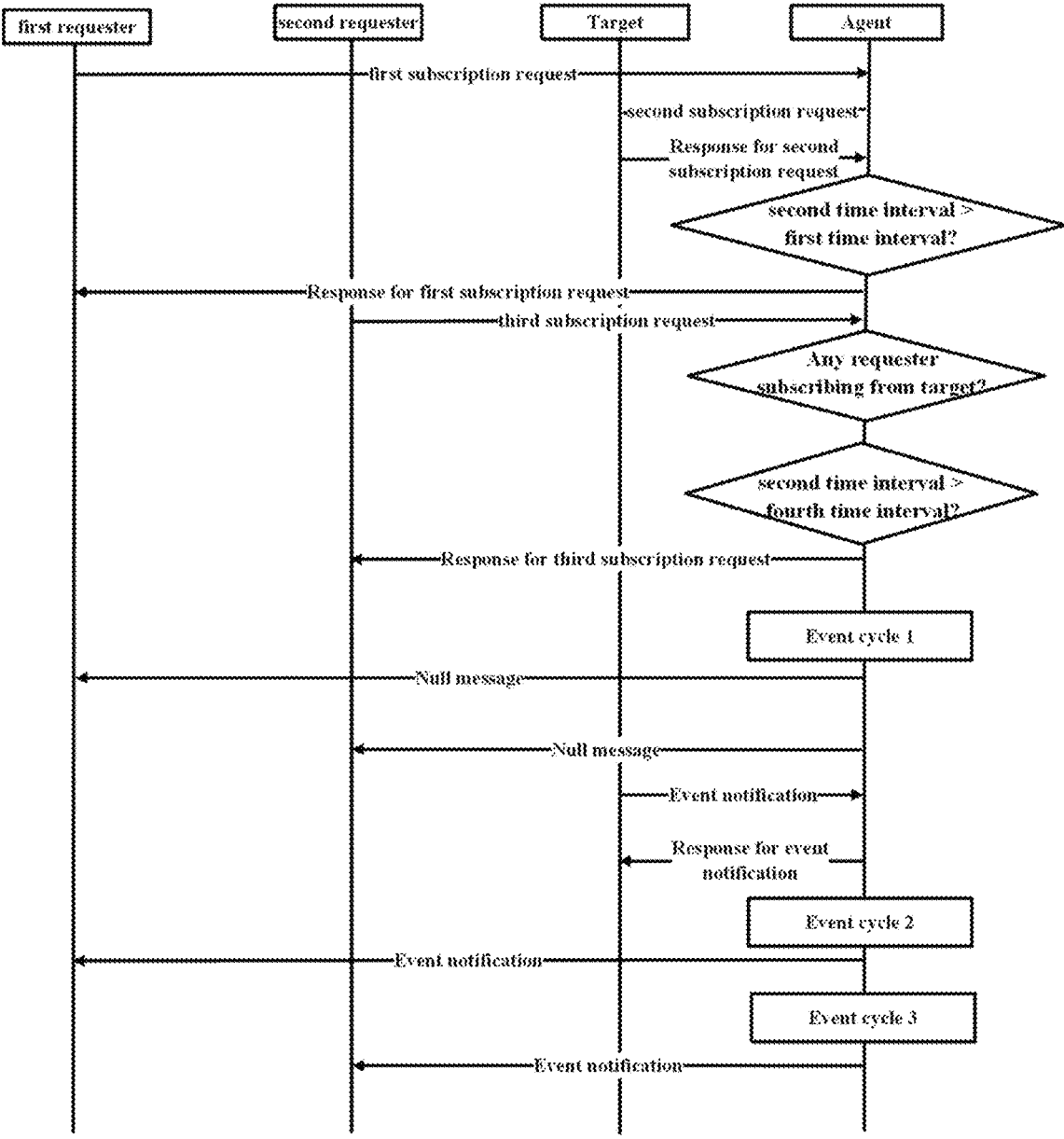
FIG. 11 is a schematic diagram showing interaction among a first requester, a second requester, a target and an agent in an Internet of Things according to an embodiment of the present disclosure.

FIG. 11 is a schematic diagram showing interaction among a first requester, a second requester, a target and an agent in an Internet of Things according to an embodiment of the present disclosure. The example scenario where the method 30 is applied as shown in FIG. 11 relates to a situation where a plurality of requesters need to subscribe from a single target. In the current interactive flow of subscribing to notification, if the target cannot meet the needs of the plurality of requesters, it results in that the plurality of requesters cannot acquire subscription data in time. To this end, by the agent perfoming the method 30 in the scenario as shown in FIG. 11, the plurality of requesters can each subscribe to data from the agent, and the agent determines that there is another requester subscribing to data from the same target subsequently, then subscribes to data from the target once, and sends the data according to the range of time interval as expected by different requesters.

Specifically, in the example scenario where the method 30 is applied as shown in FIG. 11, steps S301 to S303 in the method 30 are implemented by the agent.

Specifically, as shown in FIG. 11, in step S301, the agent receives from the first requester a first subscription request indicating that the requester expects to receive an event notification in the first time interval; the agent sends to the target a second subscription request indicating that the agent expects to receive an event notification in the first time interval; and the agent receives from the target a response for the second subscription request indicating that the target is able to send an event notification in the second time interval.

An example is taken where the first requester is an electronic album and the target is an environmental thermometer. The range of the time interval in which the electronic album expects to receive an event notification is (1 h, 1.5 h), and the electronic album will start to sleep if the 1.5 h is exceeded, and an inherent maximum interval threshold built in the thermometer for sending an event notification is 3 h. In the above step S301, the electronic album sends a first subscription request to the agent. Alternatively, the first subscription request includes an identifier of the first requester (which, for example, indicates that the first requester is an electronic album), an identifier of the target (which, for example, indicates that the target is a thermometer), and a first time interval (1 h, 1.5 h) in which the first requester expects to receive an event notification. The agent sends a second subscription request to the thermometer. Alternatively, the second subscription request includes an identifier of the first requester (which, for example, indicates that the first requester is an electronic album) and a first time interval (1 h, 1.5 h) in which the first requester expects to receive an event notification. After receiving the second subscription request, the environmental thermometer sends a response for the second subscription request to the agent, including the maximum interval threshold (Max interval) corresponding to the second time interval supported by the thermometer for sending an event notification as 3 hours. Indeed, the present disclosure is not limited to this.

Then, in step S302, the agent determines whether the second time interval exceeds the first time interval. The above example is continued where the first requester is an electronic album and the target is an environmental thermometer. After receiving the response for the second subscription request, the agent determines whether the maximum interval threshold (Max interval) corresponding to the first time interval is greater than the maximum interval threshold (Max interval ceiling) corresponding to the second time interval.

Next, in step S303, in response to determining that the second time interval exceeds the first time interval, the agent receives an event notification from the target according to the second time interval and notifies the first requester according to the first time interval.

In the above example, since 3 h>1.5 h, it can be seen that the second time interval exceeds the first time interval. The agent sends a subscription reply to the electronic album, including the maximum time interval for the agent to send an event notification as 1.5 h, through which it means that the subscription is successful. At this time, the agent may send an event notification to the electronic album in the range of time interval (1.5 h) in which the electronic album expects to send the event notification.

Alternatively, in the scenario as shown in FIG. 11, the method 30 may further include: sending, by the second requester to the agent, a third subscription request indicating that the agent receives an event notification from the target in a fourth time interval; determining whether the second time interval exceeds the fourth time interval; receiving, by the agent in response to determining that the second time interval does not exceed the fourth time interval, an event notification from the target according to the fourth time interval and notifying the second requester according to the fourth time interval; and receiving, by the agent in response to determining that the second time interval exceeds the fourth time interval, an event notification from the target according to the second time interval and notifying the second requester according to the fourth time interval.

An example is taken where the second requester is an electronic doorbell and the target is still an environmental thermometer. The range of the time interval in which the electronic doorbell expects to receive an event notification is (2.5 h, 4 h), and the electronic doorbell will start to sleep if the 4 h is exceeded, and an inherent maximum interval threshold built in the thermometer for sending an event notification is 3 h. In the above step S301, the electronic doorbell sends a first subscription request to the agent. Alternatively, the first subscription request includes an identifier of the first requester (which, for example, indicates that the first requester is an electronic doorbell), an identifier of the target (which, for example, indicates that the target is a thermometer), and a first time interval (2.5 h, 4 h) in which the first requester expects to receive an event notification. The agent sends a second subscription request to the thermometer. Alternatively, the second subscription request includes an identifier of the first requester (which, for example, indicates that the first requester is an electronic doorbell) and a first time interval (2.5 h, 4 h) in which the first requester expects to receive an event notification. After receiving the second subscription request, the environmental thermometer sends a response for the second subscription request to the agent, including the maximum interval threshold (Max interval) corresponding to the second time interval supported by the thermometer for sending an event notification as 3 hours. Indeed, the present disclosure is not limited to this.

In the above example, since 3 h<4 h, it can be seen that the second time interval does not exceed the second time interval. The agent sends a subscription reply to the electronic doorbell, including the maximum time interval for the agent to send an event notification as 4 h, which means that the subscription is successful. At this time, the agent may send an event notification to the electronic doorbell in the range of time interval (4 h) in which the electronic doorbell expects to send the event notification.

Alternatively, in the scenario as shown in FIG. 11, the method 30 may further include: sending, by the agent in response to there being no event notification received by the agent from the target in the first time interval, an event notification of null message or cached data message to the first requester; and sending, by the agent in response to there being an event notification received by the agent from the target in the second time interval, an event notification containing the latest data of the target to the first requester.

Assuming that in event cycle 1 of the electronic album (e.g., from 12:00 to 13:30 at noon), the agent receives no event notification from the thermometer, and the agent sends to the electronic album an event notification with content as null. Then, assuming that at 14:00, the agent receives an event notification from the thermometer, at which time the electronic album is already in sleep. Next, in event cycle 2 (e.g., from 14:30 to 16:00) in which the electronic album works, the agent sends the electronic album the event notification it received from the thermometer at 14:00, with content as temperature data. The electronic doorbell might work only in event cycle 3 (e.g., from 15:00 to 16:00). The agent will send the temperature data of 14:00 to the electronic doorbell during its working hours.

As such, in a case where the thermometer cannot meet the request by the electronic album or the electronic doorbell for subscribing to event notification, the demand of the electronic album or the electronic doorbell for subscription can be met with the intermediary effect of the agent.

FIG. 12 is a schematic diagram showing a method 1200 of subscribing to notification in an Internet of Things system according to an embodiment of the present disclosure. FIG. 13 is a flowchart showing a method 1200 of subscribing to notification in an Internet of Things system according to an embodiment of the present disclosure.

Referring to FIG. 13, an IoT system according to an embodiment of the present disclosure includes a requester and a target. The method 1200 includes steps S1201 to S1203.

In step S1201, a first time interval and a second time interval are determined, where the first time interval is a time interval in which the requester expects to receive an event notification from the target, and the second time interval is a time interval in which the target is able to send an event notification.

In step S1202, it is determined whether the second time interval exceeds the first time interval.

In step S1203, in response to determining that the second time interval exceeds the first time interval, a third time interval is determined based on the second time interval and the first time interval, where the third time interval is used to indicate a time interval in which the target sends an event notification.

Alternatively, the determining of the first time interval and the second time interval includes: sending, by the requester to the target, a first subscription request indicating that the requester expects to receive an event notification in the first time interval, and receiving, by the requester from the target, a response for the first subscription request indicating that the target is able to send an event notification in the second time interval. Indeed, the present disclosure is not limited to this.

Alternatively, as shown in FIG. 12, by adjusting the second time interval of the target from (MinIntervalFloorT, MaxIntervalCeilingT) to the third time interval (MinIntervalFloorNEW, MaxIntervalCeilingT), and adjusting the first time interval of the requester from (MinIntervalFloorR, MaxIntervalCeilingR) to the third time interval (MinIntervalFloorNEW, MaxIntervalCeilingT) as well, the method 1200 solves the problem that the requester might not receive the event notification sent by the target.

Alternatively, assuming that the first time interval includes a first time and a second time, and the second time interval includes a third time. The third time interval may be determined by: determining a ratio of the first time to the second time based on the first time and the second time; and determining a fourth time based on the ratio of the first time to the second time and the third time, where the ratio of the fourth time to the third time is equal to the ratio of the first time to the second time.

Specifically, as shown in FIG. 12, the first time refers to the difference between MaxIntervalCeilingR and MinIntervalFloorR, which represents the non-sleeping hours of the requester. The second time refers to MaxIntervalCeilingR, which represents the total duration of the sleeping hours and non-sleeping hours of the requester. Therefore, the ratio A of the first time to the second time can be calculated as: A=(MaxIntervalCeilingR−MinIntervalFloorR)/MaxIntervalCeilingR. The third time refers to the total duration MaxIntervalCeilingT of the sleeping hours and non-sleeping hours of the target. The fourth time refers to the non-sleeping hours in which the target is expected to update, which can be calculated as MaxIntervalCeilingT−MinIntervalFloorNEW. By adjusting the ratio B of the fourth time to the third time to be the same as the ratio A, the time range for the target to send an event notification after improvement is enabled to be matched with the requester, meeting the time requirements for working and sleeping of the requester. The ratio B can be calculated as: B=(MaxIntervalCeilingT−MinIntervalFloorNEW)/MinIntervalFloorNEW. In the case where MinIntervalFloorNEW is solved, the above third time interval (MinIntervalFloorNEW, MaxIntervalCeilingT) can be obtained.

Figure 14:
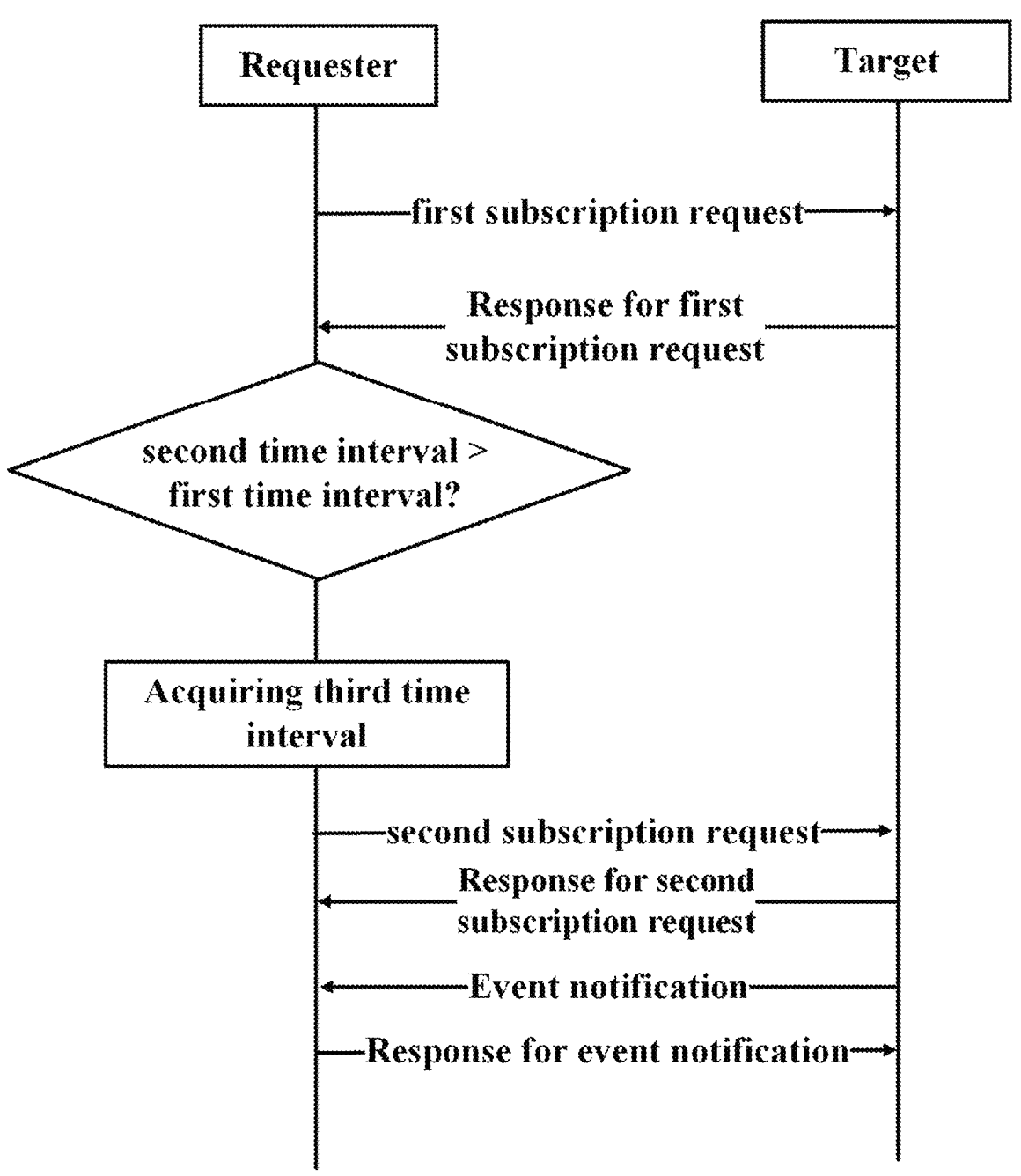
FIG. 14 is a schematic diagram showing interaction between a requester and a target in an Internet of Things according to an embodiment of the present disclosure.

FIG. 14 is a schematic diagram showing an interaction between a requester and a target in an Internet of Things according to an embodiment of the present disclosure, where the requester implements the method 1200.

As shown in FIG. 14, in step S1201, the requester sends to the target a first subscription request indicating that the requester expects to receive an event notification in the first time interval, and the requester receives from the target a response for the first subscription request indicating that the target is able to send an event notification in the second time interval.

An example is taken where the requester is an electronic album and the target is an environmental thermometer. The range of the time interval in which the electronic album expects to receive an event notification is (1 h, 1.5 h), and the electronic album will start to sleep if the 1.5 h is exceeded, and an inherent maximum interval threshold built in the thermometer for sending an event notification is 3 h. In the above step S1201, the electronic album sends a subscription request to the environmental thermometer, including the first time interval (1 h, 1.5 h) in which the electronic album expects to receive an event notification, where the maximum interval threshold (Max interval) corresponding to the first time interval is 1.5 hours, and the minimum interval threshold (Min interval) is 1 hour. After receiving the subscription request, the environmental thermometer sends a subscription reply to the electronic album, including the maximum interval threshold (Max interval) corresponding to the second time interval supported by the thermometer for sending an event notification as 3 hours. Indeed, the present disclosure is not limited to this.

Then, in step S1202, the requester determines whether the second time interval exceeds the first time interval. The above example is continued where the requester is an electronic album and the target is an environmental thermometer. After receiving the subscription reply, the electronic album determines whether the maximum interval threshold (Max interval) corresponding to the first time interval is greater than the maximum interval threshold (Max interval ceiling) corresponding to the second time interval.

Next, in step S1203, the requester determines, in response to determining that the second time interval exceeds the first time interval, a third time interval based on the second time interval and the first time interval, where the third time interval is used to indicate a time interval in which the target sends an event notification.

In the above example, since 3 h>1.5 h, it can be seen that the second time interval exceeds the first time interval. The first time corresponding to the first time interval is 1.5 h−1 h=0.5 h, and the second time is 1.5 h. Therefore, the ratio A can be calculated as 0.5 h/1.5 h=⅓. The third time of the second time interval is 3 h. According to ratio B=ratio A, a fourth time can be calculated as 1 h. Therefore, the third time interval can be determined as (2 h, 3 h).

The method 1200 may further include: acquiring, by the requester, the third time interval and sending to the target a second subscription request indicating that the requester receives an event notification according to the third time interval.

As such, the time intervals of both the requester and the target are adjusted to the third time interval, so that the requester can receive the event notification from the target.

Figure 15:
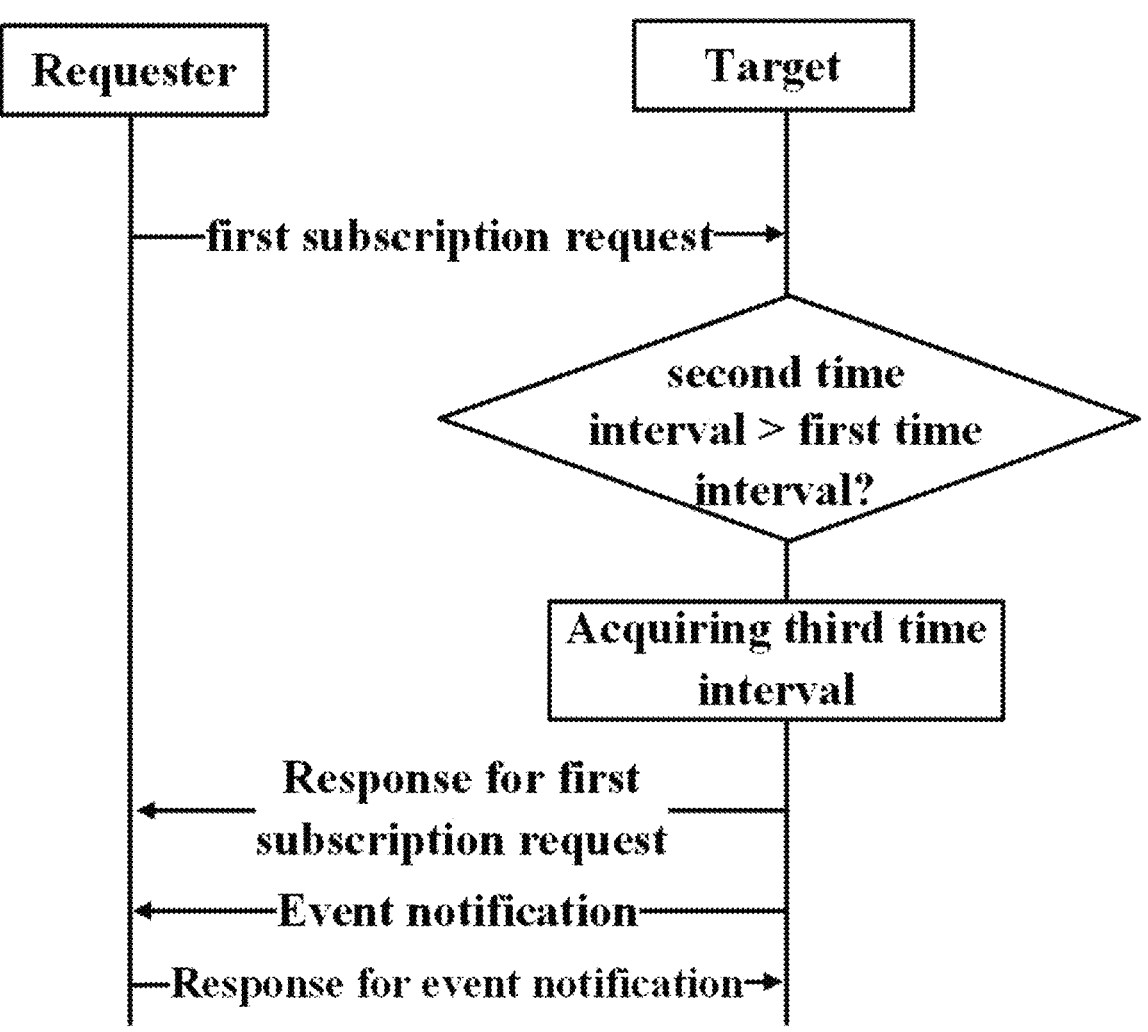
FIG. 15 is a schematic diagram showing interaction between a requester and a target in an Internet of Things according to an embodiment of the present disclosure.

FIG. 15 is a schematic diagram showing interaction between a requester and a target in an Internet of Things according to an embodiment of the present disclosure, where the target implements the method 1200.

As shown in FIG. 15, in step S1201, the target receives from the requester a first subscription request indicating that the requester expects to receive an event notification in a first time interval.

An example is taken where the requester is an electronic album and the target is an environmental thermometer. The range of the time interval in which the electronic album expects to receive an event notification is (1 h, 1.5 h), and the electronic album will start to sleep if the 1.5 h is exceeded, and an inherent maximum interval threshold built in the thermometer for sending an event notification is 3 h. In the above step S1201, the electronic album sends a subscription request to the environmental thermometer, including the first time interval (1 h, 1.5 h) in which the electronic album expects to receive an event notification, where the maximum interval threshold (Max interval) corresponding to the first time interval is 1.5 hours, and the minimum interval threshold (Min interval) is 1 hour. After receiving the subscription request, the environmental thermometer determines the maximum interval threshold (Max interval) corresponding to the second time interval supported by it for sending an event notification as 3 hours. Indeed, the present disclosure is not limited to this.

Then, in step S1202, the target determines whether the second time interval exceeds the first time interval. The above example is continued where the requester is an electronic album and the target is an environmental thermometer. After receiving the subscription reply, the electronic album determines whether the maximum interval threshold (Max interval) corresponding to the first time interval is greater than the maximum interval threshold (Max interval ceiling) corresponding to the second time interval.

Next, in step S1203, the target determines, in response to determining that the second time interval exceeds the first time interval, a third time interval based on the second time interval and the first time interval, where the third time interval is used to indicate a time interval in which the target sends an event notification.

In the above example, since 3 h>1.5 h, it can be seen that the second time interval exceeds the first time interval. The first time corresponding to the first time interval is 1.5 h−1 h=0.5 h, and the second time is 1.5 h. Therefore, the ratio A can be calculated as 0.5 h/1.5 h=⅓. The third time of the second time interval is 3 h. According to ratio B=ratio A, a fourth time can be calculated as 1 h. Therefore, the third time interval can be determined as (2 h, 3 h).

The method 1200 may further include: acquiring, by the target, the third time interval and sending an event notification to the requester according to the third time interval.

As such, the time intervals of both the requester and the target are adjusted to the third time interval, so that the requester can receive the event notification from the target.

As such, the time intervals of both the requester and the target are adjusted to the third time interval, so that the requester can receive the event notification from the target.

Figure 16:
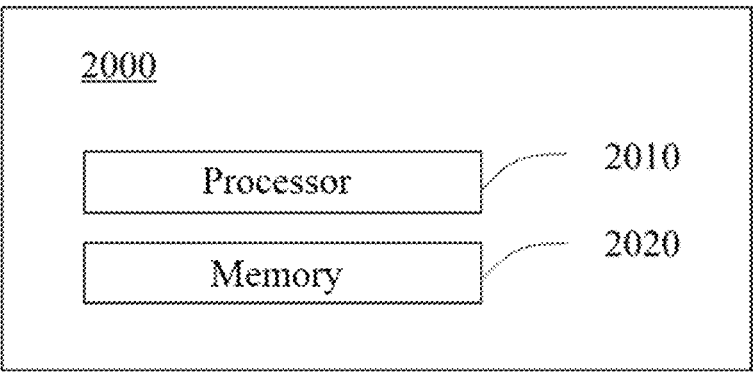
FIG. 16 shows a schematic diagram of an electronic device according to an embodiment of the present disclosure.

FIG. 16 shows a schematic diagram of an electronic device 2000 according to an embodiment of the present disclosure.

As shown in FIG. 16, the electronic device 2000 may include one or more processors 2010 and one or more memories 2020. The memory 2020 has stored therein computer-readable codes, which, when executed by the one or more processors 2010, may perform the method as described above.

The processor in the embodiments of the present disclosure can be an integrated circuit chip with signal processing capability. The above processor can be a general processor, a digital signal processor (DSP), an application specific integrated circuit (ASIC), a field programmable gate array (FPGA) or other programmable logic devices, discrete gates or transistor logic devices, and discrete hardware components. Various methods, operations and logic block diagrams as disclosed in the embodiments of the present disclosure can be implemented or performed. The general processor can be a microprocessor, or can be any conventional processor, which may be of X86 architecture or ARM architecture.

In general, various example embodiments of the present disclosure may be implemented in hardware or dedicated circuit, software, firmware, logic, or any combination thereof. Some aspects may be implemented in hardware, whereas other aspects may be implemented in firmware or software that can be executed by a controller, microprocessor or other computing device. When various aspects of the embodiments of the present disclosure are illustrated or described as block diagrams, as flowcharts, or using some other graphical representations, it will be understood that the blocks, apparatuses, systems, techniques, or methods as described herein may be implemented in hardware, software, firmware, special-purpose circuit or logic, general-purpose hardware, or controller or other computing device, or some combination thereof, as non-limiting examples.

Figure 17:
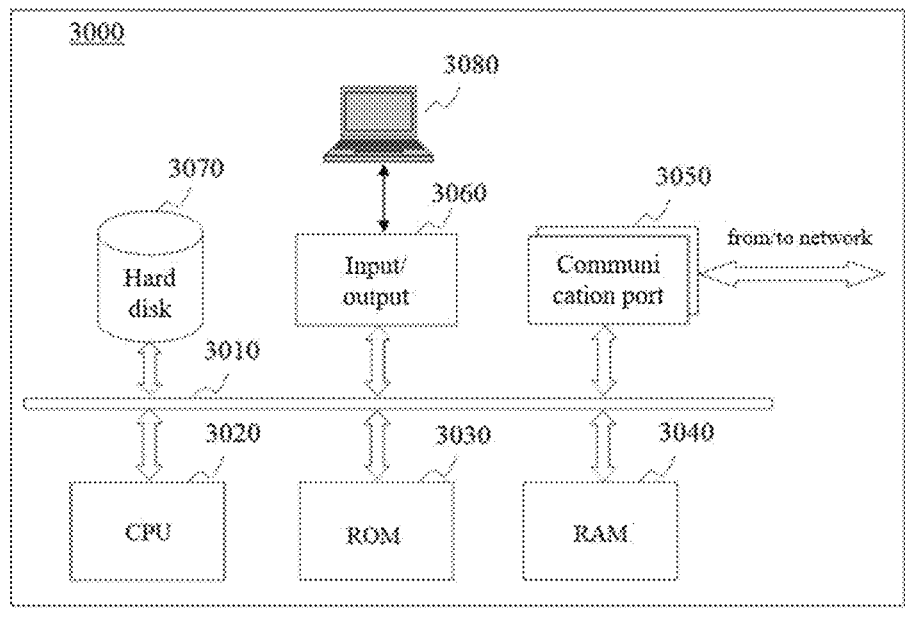
FIG. 17 shows an architectural diagram of a computing device according to an embodiment of the present disclosure.

For example, the method or apparatus according to the embodiments of the present disclosure may be implemented by means of an architecture of computing device 3000 as shown in FIG. 17. As shown in FIG. 17, the computing device 3000 may include a bus 3010, one or more CPU 3020, a read-only memory (ROM) 3030, a random access memory (RAM) 3040, a communication port 3050 connected to a network, an input/output component 3060, a hard disk 3070, and the like. A storage device in the computing device 3000, such as the ROM 3030 or the hard disk 3070, may store various data or files to be used by processes and/or communications of the methods provided by the present disclosure, as well as program instructions to be executed by the CPU. The computing device 3000 may further include a user interface 3080. Indeed, the architecture as shown in FIG. 17 is only exemplary. During the implementation of different devices, one or more components in the computing device as shown in FIG. 17 may be omitted according to actual needs.

Figure 18:
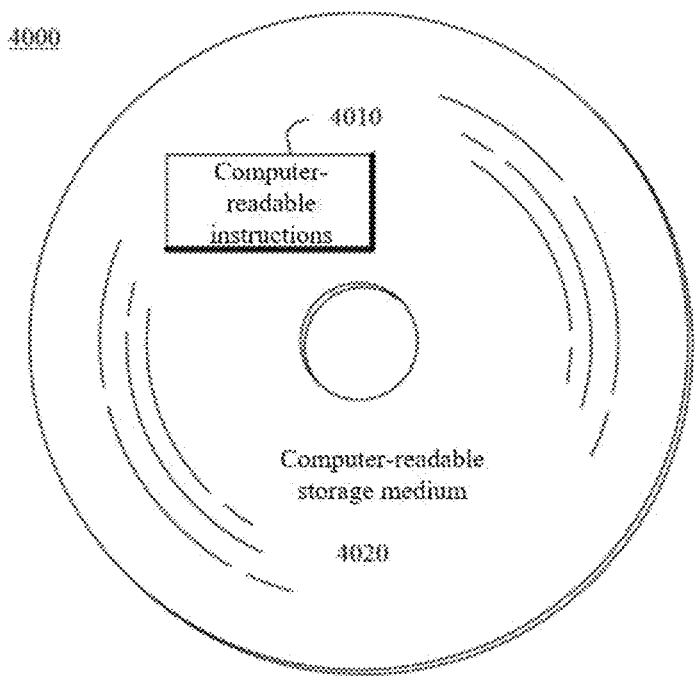
FIG. 18 shows a schematic diagram of a computer-readable storage medium according to an embodiment of the present disclosure.

According to yet another aspect of the present disclosure, there is further provided a computer-readable storage medium. FIG. 18 shows a schematic diagram of a storage medium 4000 according to the present disclosure.

As shown in FIG. 18, the computer storage medium 4020 has stored computer-readable instructions 4010 thereon. When the computer-readable instructions 4010 are executed by a processor, the method according to the embodiments of the present disclosure as described with reference to the above drawings may be performed. The computer-readable storage medium in the embodiments of the present disclosure may be a volatile or nonvolatile memory, or may include both volatile and nonvolatile memories. The non-volatile memory may be read-only memory (ROM), programmable read-only memory (PROM), erasable programmable read-only memory (EPROM), electrically erasable programmable read-only memory (EEPROM) or flash memory. The volatile memory may be random access memory (RAM) used as external cache. By way of illustration but not limitation, many forms of RAMs are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous link dynamic random access memory (SLDRAM) and direct Rambus random access memory (DR RAM). It should be noted that the memories of the methods as described herein are intended to include, but are not limited to, these and any other suitable types of memories. It should be noted that the memories of the methods as described herein are intended to include, but are not limited to, these and any other suitable types of memories.

An embodiment of the present disclosure further provides a computer program product or computer program including computer instructions, which are stored in a computer-readable storage medium. A processor of a computer device reads the computer instructions from the computer-readable storage medium, and the processor executes the computer instructions, so that the computer device performs the method according to the embodiments of the present disclosure.

It should be stated that the flowcharts and block diagrams in the drawings illustrate possibly implemented architectures, functions and operations of systems, methods and computer program products according to various embodiments of the present disclosure. In this regard, each block in the flowcharts or block diagrams may represent a module, a segment of program, or a part of codes that contains one or more executable instructions for implementing specified logical functions. It should also be noted that in some alternative implementations, the functions as denoted in the blocks may occur in a different order than that as denoted in the drawings. For example, two blocks as shown in succession may actually be executed substantially in parallel, and sometimes they may be executed in a reverse order, depending on the functions involved. It is also to be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions.

In general, various example embodiments of the present disclosure may be implemented in hardware or dedicated circuit, software, firmware, logic, or any combination thereof. Some aspects may be implemented in hardware, whereas other aspects may be implemented in firmware or software that can be executed by a controller, microprocessor or other computing device. When various aspects of the embodiments of the present disclosure are illustrated or described as block diagrams, as flowcharts, or using some other graphical representations, it will be understood that the blocks, apparatuses, systems, techniques, or methods as described herein may be implemented in hardware, software, firmware, special-purpose circuit or logic, general-purpose hardware, or controller or other computing device, or some combination thereof, as non-limiting examples.

The exemplary embodiments of the present disclosure as described in detail above are merely illustrative, but not restrictive. It should be understood by those skilled in the art that various modifications and combinations can be made to these embodiments or their features without departing from the principles and spirits of the present disclosure, and such modifications should fall within the scope of the present disclosure.

The invention claimed is:

1. A method of subscribing to notification in an Internet of Things system including a requester, a target and an agent, the method comprising:

determining a first time interval and a second time interval, wherein the first time interval is a time interval in which the requester expects to receive an event notification from the target, and the second time interval is a time interval in which the target is able to send the event notification;

determining whether the second time interval exceeds the first time interval; and receiving, by the agent in response to determining that the second time interval exceeds the first time interval, the event notification from the target according to the second time interval and notifying the requester according to the first time interval.

2. The method according to claim 1, wherein the target includes a first target and a second target, the first target is able to send the event notification in the second time interval, and the second target is able to send the event notification in a third time interval, the method further comprising:

receiving, by the agent in response to determining that the second time interval exceeds the first time interval, the event notification from the first target and notifying the requester according to the first time interval; and notifying, by the target in response to determining that the third time interval does not exceed the first time interval, the requester according to the first time interval.

3. The method according to claim 1, wherein the target includes a first target and a second target, the first target is able to send the event notification in the second time interval, and the second target is able to send the event notification in a third time interval, the method further comprising:

receiving, by the agent in response to determining that the second time interval exceeds the first time interval, the event notification from the first target according to the second time interval and notifying the requester according to the first time interval; and receiving, by the agent in response to determining that the third time interval does not exceed the first time interval, the event notification from the second target according to the third time interval and notifying the requester according to the first time interval.

4. The method according to claim 1, wherein the target includes a first target and a second target, the first target is able to send the event notification in the second time interval, and the second target is able to send the event notification in a third time interval, the method further comprising:

receiving, by the agent in response to determining that the second time interval exceeds the first time interval, the event notification from the first target according to the second time interval;

receiving, by the agent in response to determining that the third time interval does not exceed the first time interval, the event notification from the second target according to the third time interval; and sending, by the agent to the requester, event notifications from the first target and the second target according to the first time interval.

5. The method according to claim 1, wherein the requester includes a first requester and a second requester, and the method further comprising:

sending, by the second requester to the agent, a third subscription request indicating that the agent receives the event notification from the target in a fourth time interval;

determining whether the second time interval exceeds the fourth time interval;

receiving, by the agent in response to determining that the second time interval does not exceed the fourth time interval, the event notification from the target according to the fourth time interval and notifying the second requester according to the fourth time interval; and receiving, by the agent in response to determining that the second time interval exceeds the fourth time interval, the event notification from the target according to the second time interval and notifying the second requester according to the fourth time interval.

6. The method according to claim 1, further comprising:

sending, by the agent in response to no event notification being received by the agent from the target in the first time interval, an event notification of null message or cached data message to the requester; and sending, by the agent in response to the event notification being received by the agent from the target in the second time interval, an event notification containing the latest data of the target to the requester.

7. The method according to claim 1, wherein the determining the first time interval and the second time interval comprises:

sending, by the requester to the target, a first subscription request indicating that the requester expects to receive the event notification in the first time interval, and receiving, by the requester from the target, a response for the first subscription request indicating that the target is able to send the event notification in the second time interval.

8. The method according to claim 1, wherein it is the requester who determines whether the second time interval exceeds the first time interval, and it is the requester who sends, in response to determining that the second time interval exceeds the first time interval, a subscription request to the agent, to cause the agent to receive an event notification from the target according to the second time interval and to notify the requester according to the first time interval.

9. The method according to claim 1, wherein the determining the first time interval and the second time interval comprises:

receiving, by the agent from the requester, a first subscription request indicating that the requester expects to receive the event notification in the first time interval, sending, by the agent to the target, a second subscription request indicating that the agent expects to receive the event notification in the first time interval, and receiving, by the agent from the target, a response for the second subscription request indicating that the target is able to send the event notification in the second time interval.

10. A subscription management method for an Internet of Things system including a requester, a target and an agent, the method comprising:

sending, by the requester to the target, a first subscription request indicating that the requester expects to receive an event notification in a first time interval;

receiving, by the requester from the target, a response for the first subscription request indicating that the target is able to send the event notification in a second time interval;

determining, by the requester, whether the second time interval exceeds the first time interval;

sending, by the requester in response to determining that the second time interval exceeds the first time interval, a second subscription request to the agent, the second subscription request indicating that the agent receives the event notification from the target and including the first time interval;

sending, by the agent to the target, a third subscription request including an identifier of the requester and the first time interval;

sending, by the target to the agent, a response for the third subscription request including the second time interval;

sending, by the agent to the requester, a response for the second subscription request indicating that the agent receives the event notification from the target;

sending, by the agent in response to there being no event notification received by the agent from the target in the first time interval, the event notification of null message or cached data message to the requester; and sending, by the agent in response to there being the event notification received by the agent from the target in the second time interval, the event notification containing the latest data of the target to the requester.

11. An electronic device, comprising:

one or more processors; and one or more memories having stored therein computer readable codes which, when executed by the one or more processors, perform the method according to claim 1.

12. A non-transient computer-readable storage medium having stored thereon instructions which, when executed by a processor, cause the processor to perform the method according to claim 1.

13. An agent in an Internet of Things system, wherein the agent is configured to perform the method according to claim 1.

* * * * *